(12) United States Patent
Okada et al.

(10) Patent No.: US 6,830,115 B2
(45) Date of Patent: Dec. 14, 2004

(54) AXLE DRIVING APPARATUS

(76) Inventors: Hideaki Okada, 2-18-1 Inadera, Amagasak-shi (JP); Norihiro Ishii, 2-18-1, Inadera, Amagasaki-shi (JP); Robert Abend, 5943 Commerce Blvd., Morristown, TN (US) 37814-1051; Krista Winfree, 5943 Commerce Blvd., Morristown, TN (US) 37814-1051

( * ) Notice: Subject to any disclaimer, the term of this patent is extended or adjusted under 35 U.S.C. 154(b) by 0 days.

(21) Appl. No.: 10/146,952

(22) Filed: May 17, 2002

(65) Prior Publication Data

US 2003/0213625 A1 Nov. 20, 2003

(51) Int. Cl.$^7$ ............................................. B62D 11/00
(52) U.S. Cl. ...................... 180/6.44; 180/6.2; 180/6.26; 56/10.8
(58) Field of Search ................................ 180/6.2, 6.24, 180/6.28, 6.44, 6.48, 375; 56/10.6, 10.8, 11.4, 11.6, 11.8, DIG. 6

(56) References Cited

U.S. PATENT DOCUMENTS

| | | | |
|---|---|---|---|
| 4,771,856 A | | 9/1988 | Hutchinson et al. ......... 180/333 |
| 5,021,037 A | * | 6/1991 | Tervola ......................... 475/25 |
| 5,191,755 A | * | 3/1993 | Gryspeerdt .................. 56/13.4 |
| 5,957,229 A | * | 9/1999 | Ishii ............................ 180/6.48 |
| 6,126,564 A | * | 10/2000 | Irikura et al. .................. 475/24 |
| 6,141,947 A | | 11/2000 | Borling ........................ 56/10.8 |
| 6,220,006 B1 | * | 4/2001 | Borling ........................ 56/10.8 |
| 6,282,873 B1 | * | 9/2001 | Wilken ......................... 56/11.3 |
| 6,390,227 B1 | * | 5/2002 | Abend et al. ............... 180/375 |
| 6,484,486 B2 | * | 11/2002 | Nagai et al. .................. 56/16.8 |
| 6,554,085 B2 | * | 4/2003 | Hasegawa et al. ......... 180/6.26 |
| 6,557,330 B2 | * | 5/2003 | Hubscher ..................... 56/10.8 |
| 2003/0144097 A1 | | 7/2003 | Brandsma et al. | |

* cited by examiner

Primary Examiner—Lesley D. Morris
Assistant Examiner—L. Lum
(74) Attorney, Agent, or Firm—Sterne, Kessler, Goldstein & Fox P.L.L.C.

(57) ABSTRACT

An axle driving apparatus of the invention is available for an economical vehicle having a belt type stepless transmission. The axle driving apparatus includes a pair of axles connected to respective drive wheels, a propelling transmission mechanism, and a steering transmission mechanism. The propelling transmission mechanism is drivingly connected to said prime mover through said belt type stepless transmission so as to transmit speed-variable output rotation of said belt type stepless transmission to both said axles, thereby rotating said axles together at various speeds in a common direction selected from two opposite directions for forward and backward traveling of said vehicle. The steering transmission mechanism is drivingly connected to said prime mover so as to transmit two oppositely directive output rotations to said respective axles, thereby differentially rotating said axles at various differences of rotational speed between said axles. If the belt type stepless transmission comprises first and second belts through a variator pulley and the second belt is looped over an input pulley of the propelling transmission mechanism, the first belt may be looped over an input pulley of the steering transmission mechanism. Alternatively, the first belt may be looped over a power taking-out pulley provided on an input shaft of the steering transmission mechanism.

56 Claims, 23 Drawing Sheets

AXLE DRIVING APPARATUS

BACKGROUND OF THE INVENTION

1. Field of the Invention

The present invention relates to an axle driving apparatus comprising a pair of axles differentially connected to each other, a propelling transmission mechanism for rotating both the axles together at various speeds in the same direction alternatively selected from two opposite directions for forward and backward traveling of the vehicle, and a steering transmission mechanism for transmitting oppositely directive forces to the respective axles so as to generate a difference of rotational speed between the axles, and wherein the axle driving apparatus is provided for a vehicle (e.g., a mower tractor, installed with a belt type stepless transmission).

Also, the present invention relates to a steering mechanism of a caster which is available for a working vehicle such as a mower tractor requiring a small turn radius, wherein the working vehicle is provided with an axle driving apparatus comprising a propelling transmission mechanism that transmits propelling force to both mutually differentially connected axles and a steering transmission mechanism that transmits oppositely directive forces to the respective axles.

2. Related Art\

Conventionally, as disclosed in Japan Patent Laid Open Gazette Nos. Sho 62-28,554 and Hei 1-234,644, and U.S. Pat. Nos. 6,141,947 and 4,771,856, and others, there is a well-known belt type stepless transmission having a double pulley, namely, a variator. Additionally, there is a well-known vehicle such as a mower tractor having the belt type stepless transmission, wherein first and second belts are looped over respective pulley portions of the double pulley so that the tension of the first belt is changed so as to change the rate of driving speed of the subsequent second belt to that of the first belt.

Especially, Japan Patent Laid Open Gazette No. Hei 1-234,644 discloses a vehicle which utilizes a speed difference between the first and second belts looped over the variator so as to change its traveling direction and speed.

The above-mentioned belt type stepless transmission using the variator is advantageouss to working vehicles such as a mower tractor requiring stepless variation of traveling speed because it is more economical than a hydrostatic stepless transmission (an HST).

Also, conventionally, there is a well-known vehicle having a steering transmission which transmits power of a prime mover in two ways so as to make a difference of rotational speed between left and right drive wheels, that is, accelerate one drive wheel and decelerate the other according to the operation of a steering device such as a steering wheel. An HST may serve as the steering transmission.

However, none of the above-mentioned documents discloses such a steering transmission. More specifically, there is no conventional vehicle having a belt type stepless transmission as mentioned above which transmits its output to such a steering transmission. Such a driving combination of the belt type stepless transmission and the steering transmission, if it is invented, will be advantageous to provide an economical working vehicle.

Furthermore, conventionally, there is a well-known small working vehicle like a mower tractor which has at least one caster for enabling a very small turn radius. However, a conventional caster provided on such a working vehicle is not steered by a steering device like a steering wheel.

A caster which is not steerable has a disadvantage in its weakness against a side force. More specifically, if a vehicle, e.g., a mower tractor with such a caster descending a slope slantwise, the caster is oriented more downward than the driving direction of the vehicle because the weight of the vehicle is applied as a side force onto the caster. Therefore, the vehicle can descend slantwise comparatively smoothly. Then, if the vehicle is going to ascend the slope slantwise, the downwardly oriented caster is hard to turn upward because of the side force. Therefore, the vehicle cannot ascend slantwise smoothly.

Thus, it is required that a steering operational force of the steering device be forcibly applied onto the caster so as to steer the caster without disturbing the steering operation while the wheels of the casters are allowed to rotate freely according to the force applied from the ground regardless of the steering condition.

SUMMARY OF THE INVENTION

An object of the present invention is to provide an axle driving apparatus for an economical vehicle which turn has a small turn radius and whose traveling speed varies steplessly.

To achieve the object, an axle driving apparatus according to the present invention is suitable to a vehicle having a prime mover and a belt type stepless transmission. The axle driving apparatus comprises a pair of axles connected to respective drive wheels, a propelling transmission mechanism and a steering transmission mechanism. The propelling transmission mechanism is drivingly connected to said prime mover through said belt type stepless transmission so as to transmit speed-variable output rotation of said belt type stepless transmission to both said axles, thereby rotating said axles together at various speeds in a common direction selected from two opposite directions for forward and backward traveling of said vehicle. The steering transmission mechanism is drivingly connected to said prime mover so as to transmit two oppositely directive output rotations to said respective axles, thereby differentially rotating said axles at various differences of rotational speed between said axles.

An accelerator such as a pedal is operatively connected to said belt type transmission so as to change the output rotational speed of said propelling transmission mechanism. A steering operation device such as a steering wheel is operatively connected to said steering transmission so as to change the output rotational speed of said steering transmission.

The steering transmission mechanism may comprise a hydrostatic transmission.

The pair of axles may be differentially connected to each other through a first differential mechanism. In this case, said first differential mechanism transmits the output rotation of said propelling transmission mechanism to both said axles, and allows said axle to be differentially rotated by the oppositely directive output rotations of said steering transmission mechanism transmitted to said respective axles.

Furthermore, a second differential mechanism driven by said steering transmission mechanism may be provided so as to generate two oppositely rotational forces applied onto said respective axles.

A housing of the axle driving apparatus may incorporate the axles, the propelling transmission mechanism and the steering transmission mechanism together. Furthermore, the first and second differential mechanisms may be disposed together in the housing.

The housing may comprise a first chamber in which the axles, the propelling transmission mechanism and the first and second differential mechanisms are disposed, and a second chamber in which the steering transmission mechanism is disposed.

Alternatively, the axle driving apparatus may comprise at least first and second housings. The first housing may incorporate the axles and the propelling transmission mechanism, and further, the first differential mechanism. The second housing may incorporate the steering transmission mechanism, and further, the second transmission mechanism. In this case, a transmission mechanism may be interposed between the first and second housings so as to transmit the two oppositely directive output rotations of the second differential mechanism to the respective axles.

The belt type stepless transmission may be constructed as follows.

A pair of first and second belts are looped over a variator pulley such as a double pulley. The first belt receives the power of the prime mover prior to the second belt. The first belt may be driven at a constant speed determined according to the output rotational speed of the prime mover. The first belt is looped over a first idler pulley for tension variation thereof. The accelerator is operatively connected to the first idler pulley. The second belt is looped over a second idler pulley for tension-variation thereof. The variator changes a driving speed ratio of the second belt to the first belt according to the tension-variation of the first belt by operation of the accelerator.

The axle driving apparatus is basically provided with an input pulley over which the second belt is looped so as to transmit the speed-variable output of the belt type stepless transmission to the propelling transmission mechanism.

For inputting of the steering transmission mechanism, the first belt may be looped over an input pulley of the steering transmission mechanism. If the first belt is driven at the constant speed determined according to the output rotational speed of the prime mover, the input pulley of the steering transmission mechanism is rotated at a constant speed. Furthermore, if the steering transmission mechanism comprises a hydrostatic transmission, a hydraulic pump thereof can be driven at a constant speed.

Alternatively, the input pulley of the propelling transmission mechanism over which the second belt is looped may also be used as an input pulley of the steering transmission mechanism so as to allow the input rotational speed of the steering transmission to vary in proportion to the variation of driving speed of the second belt according to the operation of the accelerator.

Alternatively, a common input device shared between the belt type stepless transmission and the steering transmission mechanism may receive power of the prime mover. If the steering transmission mechanism comprises a hydrostatic transmission, it may be so constructed that a pump shaft of the hydrostatic transmission may be drivingly connected to the common input device. A pulley over which the first belt is looped is fixed onto the pump shaft so as to transmit the rotational force of the pump shaft to the first belt of the belt type stepless transmission.

For switching the rotational direction of the drive wheels between forward and backward, a switching device whose output rotational direction is selected between two opposite directions may be provided.

The switching device may be provided in the propelling transmission mechanism between the belt type stepless transmission and the pair of axles. If the first differential mechanism is provided, the switching device may be interposed between the belt type stepless transmission and the first differential.

If the common input device receiving power of the prime mover is provided, power of the common input device may be transmitted through the switching device to both the steering transmission mechanism and the belt type stepless transmission. When a hydrostatic transmission serves as the steering transmission and the pulley over which the first belt is looped is fixed onto the pump shaft of the hydrostatic transmission, the switching device is interposed between the common input device and the pump shaft. Due to this construction, the operational direction of the steering operation device, e.g., the turning direction of a steering wheel, can coincide with the target side of the vehicle to be turned whether the vehicle travels forward or backward.

The propelling transmission mechanism may comprise a third differential mechanism differentially mutually connecting two pulleys over which the first and second pulleys are looped respectively. If the above-mentioned first differential mechanism is provided, the output rotational force of the third differential mechanism is transmitted to the first differential mechanism so as to rotate the pair of axles together in a common direction at various speeds. Since the output rotational direction of the third differential mechanism can be switched according to the difference of rotational speed between the two pulleys, the traveling direction of a vehicle can be switched between forward and backward only by operation of the accelerator.

The third differential mechanism may be of either a planetary gear type or a bevel gear type. If the third differential mechanism is of a planetary gear type, the third differential may comprise a sun gear, a planet gear and a ring gear. The sun gear is fixed to the pulley over which the first belt is looped. The ring gear includes an outer gear and an inner gear. The planet gear engages between the sun gear and the inner gear of the ring gear. A variable-speed gear is fixed to the pulley over which the second belt is looped and engages with the outer gear of the ring gear. The revolution of the planet gear around the sun gear is transmitted to the pair of axles so as to rotate the pair of axles together at various speeds in a common direction that is selected in either the forward or backward traveling direction.

If the first and third differential mechanisms drivingly connected to each other as mentioned above are provided, the output force of the steering transmission mechanism may be applied onto one of the axles so as to rotate the pair of axles in opposite directions and change the relative speed between the axles instead of the second differential mechanism. In this case, a clutch may be interposed between the output portion of the steering transmission mechanism and the one axle so as to secure a dead zone of the steering operation device. If the steering transmission mechanism comprises a hydrostatic transmission, a bypass replacing or in addition to the clutch may be interposed between a pair of oil passages between a hydraulic pump and a hydraulic motor.

A second object of the present invention is to provide a small turn radius turnable vehicle with a caster improved so that the caster can be adequately directed so as to overcome a sideward resistant force from the ground, comprising a prime mover, a pair of left and right drive wheels, an axle driving apparatus, and a steering operation device, wherein the axle driving apparatus includes a pair of axles driven by the prime mover and drivingly connected to the respective drive wheels and a steering transmission for rotating the pair of axles in opposite directions and changing a relative speed between the pair of axles, and wherein the steering operation device is operatively connected to the steering transmission so as to change the output rotational direction and speed of the steering transmission.

To achieve the second object, the caster is rotated laterally with respect to a vehicle by operating the steering operation device. That is, the torque caused by operation of the steering operation device is transmitted to the caster so as to overcome the sideward force from the ground.

A clutch, which is switched between an engaging condition and a disengaging condition, may be interposed between the caster and the steering operation device. The clutch set in the engaging condition allows a torque generated by the steering operation device to be transmitted to the caster. The clutch set in the disengaging condition prevents the torque generated by the steering operation device from being transmitted to the caster.

The clutch may be switched by electromagnetic control.

Furthermore, a torque diode, a bi-directional clutch or so on prevents a side force applied onto the caster from the ground for swinging the caster laterally about the vehicle from being transmitted to the steering operation device, thereby preventing operation of the steering operation device from being disturbed by the free lateral movement of the caster.

Other and further objects, features and advantages of the invention will appear more fully from the following description.

DETAILED DESCRIPTION OF THE INVENTION

Figure 1:
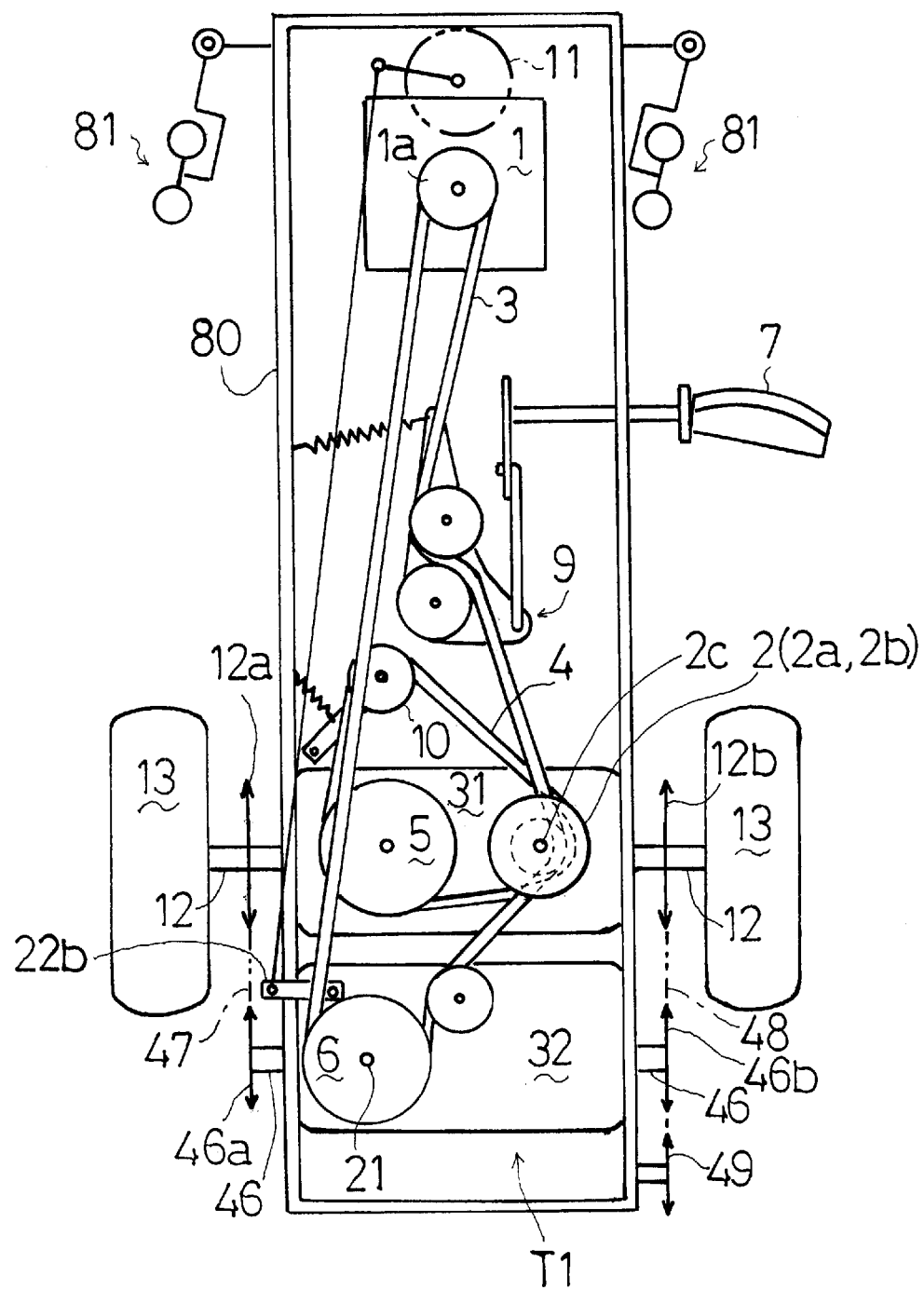
FIG. 1 is a schematic plan view of a vehicle installed with an axle driving apparatus T1 and a belt type transmission according to the present invention.

Referring to FIGS. 1, 4, 6, 9, 12, 18 and 20, a vehicle is provided with one of axle driving apparatuses T1, T2, T3, T4, T5, T6 and T7 (hereinafter, each of axle driving apparatuses T1–T7 is referred to as an axle driving apparatus T unless it is specified to be distinguished from the others.) of the present invention, in combination with a belt type stepless transmission having a variator 2 over which a first belt 3 and a second belt 4 are looped. An engine 1 and axle driving apparatus T are fixedly mounted on a vehicle frame 80. Axle driving apparatus T is provided with a pair of left and right axles 12 projecting oppositely laterally. A drive wheel 13 is provided on an outer end of each of axles 12.

Axle driving apparatus T comprises a propelling transmission mechanism and a differential mechanism differentially connecting left and right axles 12 with each other so that the final output force of the belt type transmission is transmitted through the propelling transmission mechanism into the differential mechanism for propelling drive wheels 13.

Axle driving apparatus T also comprises a steering transmission mechanism such as a later-discussed hydrostatic transmission (hereinafter, "HST") 20 which transmits two oppositely directive output forces to respective axles 12. The output force of the steering transmission mechanism is transmitted to the differential mechanism so as to accelerate one axle 12 and decelerate the other axle 12, thereby turning the vehicle left or right.

The vehicle installed with axle driving apparatus T is equipped with steering wheel 11 serving as a steering operation device which is operatively connected to the steering transmission mechanism for variation of the relative speed between left and right axles 12, thereby changing the leftward or rightward turning radius of the vehicle. Representatively, if HST 20 serves as the steering transmission mechanism, steering wheel 11 is operatively connected to a lever 22b which is pivotally provided on axle driving apparatus T so as to interlock with a movable swash plate of a hydraulic pump of HST 20.

As steering wheel 11 is turned from its neutral position for turning the vehicle left or right, the output rotation of the steering transmission in selected one of opposite directions is accelerated so as to increase the difference of rotational speed between left and right axles 12 driven by the belt type transmission and the propelling transmission mechanism of axle driving apparatus T, wherein the positive acceleration of one axle 12 on turning side of the vehicle equals the negative acceleration (deceleration) of the other axle 12 at the opposite side. If the degree of turned steering wheel 11 exceeds a certain degree, the deceleration force of the steering transmission mechanism applied onto one axle 12 on the side to which the vehicle is turning comes to exceed the output force of the propelling transmission mechanism applied thereonto, thereby reversing the rotational direction of the one axle 12.

Figure 2:
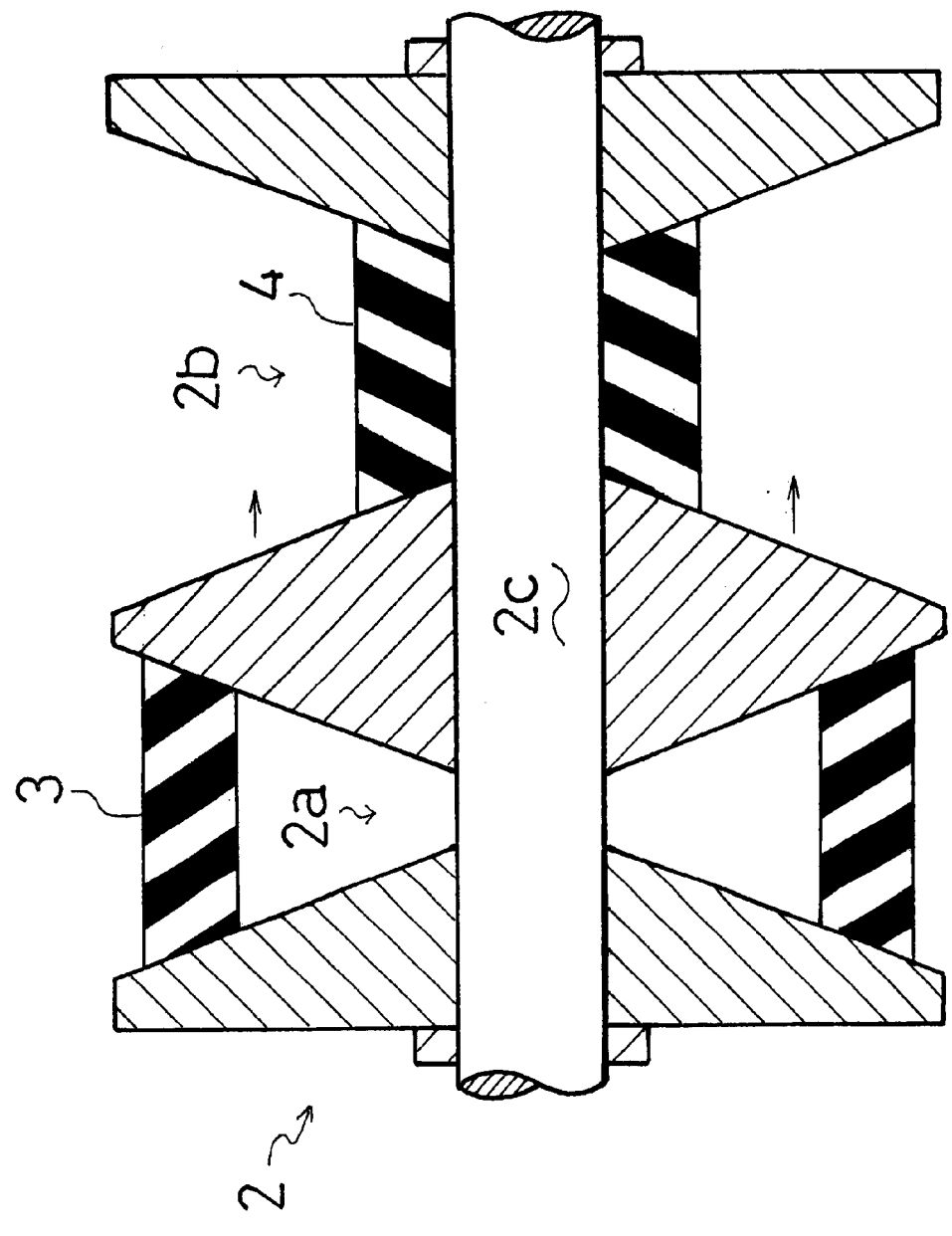
FIG. 2 is a sectional side view of a variator 2 of the belt type transmission.

Referring to the belt type stepless transmission, variator 2 is a double pulley constituted by a pair of pulley portions 2a and 2b provided on a common pulley shaft 2c, as shown in FIG. 2. A first belt 3 and a second belt 4 are looped over respective pulley portions 2a and 2b. For transmitting power to axle driving apparatus T, first belt 3 may be directly looped over a crankshaft pulley 1a of an engine 1. Alternatively, another belt such as a later-discussed belt 14 may be interposed between crankshaft pulley 1a and first belt 3. An important point is that first belt 3 is prior to second belt 4 with respect to engine 1 serving as a prime mover. The crankshaft of engine 1 may be rotated at various speeds. However, all of the following embodiments about the belt type stepless transmission will be predicated on the idea that the crankshaft of engine 1 is rotated at a constant speed, that is, first belt 3 is driven at a constant speed.

Figure 12:
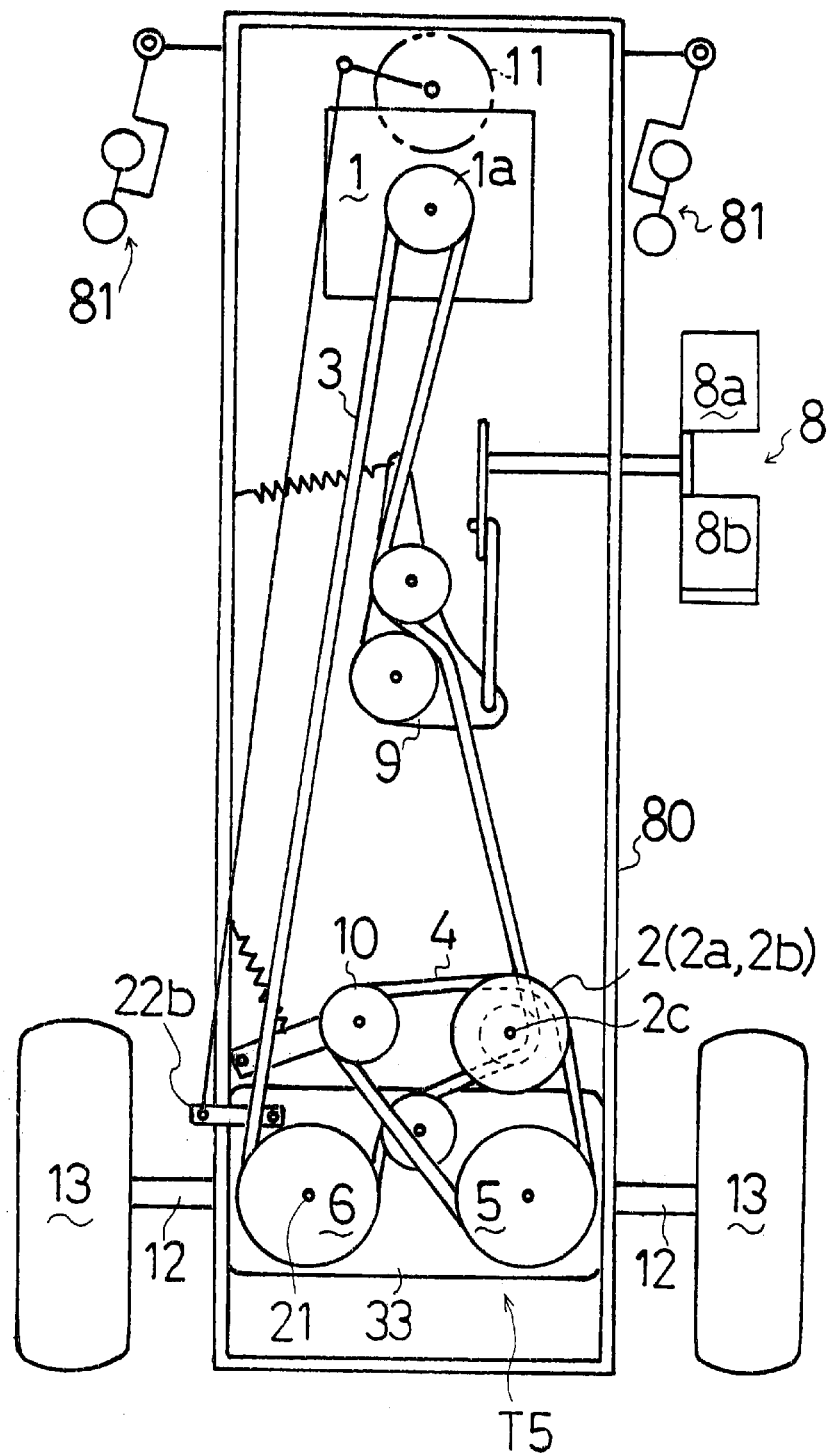
FIG. 12 is a schematic plan view of a vehicle installed with an axle driving apparatus T5 and a belt type transmission according to the present invention.

First belt 3 is looped over a swing pulley 9 serving as an idler pulley operatively connected to an accelerator pedal 7 (or a later-discussed accelerator pedal 8 for axle driving apparatus T5 as shown in FIG. 12) serving as an accelerator. By moving of swing pulley 9, the farther accelerator pedal 7 is depressed, the more first belt 3 is tightened, that is, the tension of first belt 3 is increased.

Variator 2 changes the driving speed ratio of second belt 4 to first belt 3 according to variation of the tension of first belt 3 by swinging of swing pulley 9. In detail, the more the tension of first belt 3 is increased so as to slide the pulley member between belts 3 and 4 along pulley shaft 2c in the way described by arrows in FIG. 2, the deeper first belt 3 enters pulley portion 2a so as to widen pulley portion 2a, thereby narrowing pulley portion 2b so as to press out second belt 4. That is, according to increase of the tension of first belt 3, the diameter of first belt 3 about pulley shaft 2c is increased so as to decrease the diameter of second belt 4 about pulley shaft 2c, thereby increasing the driving speed of second belt 4 in relative to that of first belt 3. Briefly, the farther accelerator pedal 7 is depressed, the faster second belt 4 drives while crankshaft 1a and first belt 3 are driven at a constant speed.

Second belt 4 is looped over a propelling input pulley 5 serving as an input pulley of the propelling transmission mechanism, which transmits speed-variable output rotation of pulley 5 through the differential mechanism between axles 12 so as to rotate both axles 12 at various speeds in the same direction selected from two opposite directions for forward and backward traveling of the vehicle. Furthermore, second belt 4 is looped over idler pulley 10 which swings in correspondence to the tension-variation of second belt 4 so as to keep an adequate tension of second belt 4. In this way, according to the depressing operation of accelerator pedal 7, the rotational speed of pulley 5 varies so as to change the rotational speed of both axles 12 in the same direction, thereby changing the traveling speed of the vehicle.

Each of vehicles of FIGS. 1, 4, 6, 9, 12, 18 and 20 is steered by generating the difference of rotational speed between left and right drive wheels 13 serving as rear wheels. Further, it is provided with left and right casters 81 which laterally swivel following the left and right turning of the vehicle. Moreover, casters 81 may be able to be steered by steering wheel 11. The construction of such steerable casters 81 will be described after the next description of various embodiments of axle driving apparatus T in combination with the belt type stepless transmission.

Each of axle driving apparatuses T1–T7 and one or more preferred embodiments thereof will be detailed in accordance with FIGS. 1 to 20.

Figure 3:
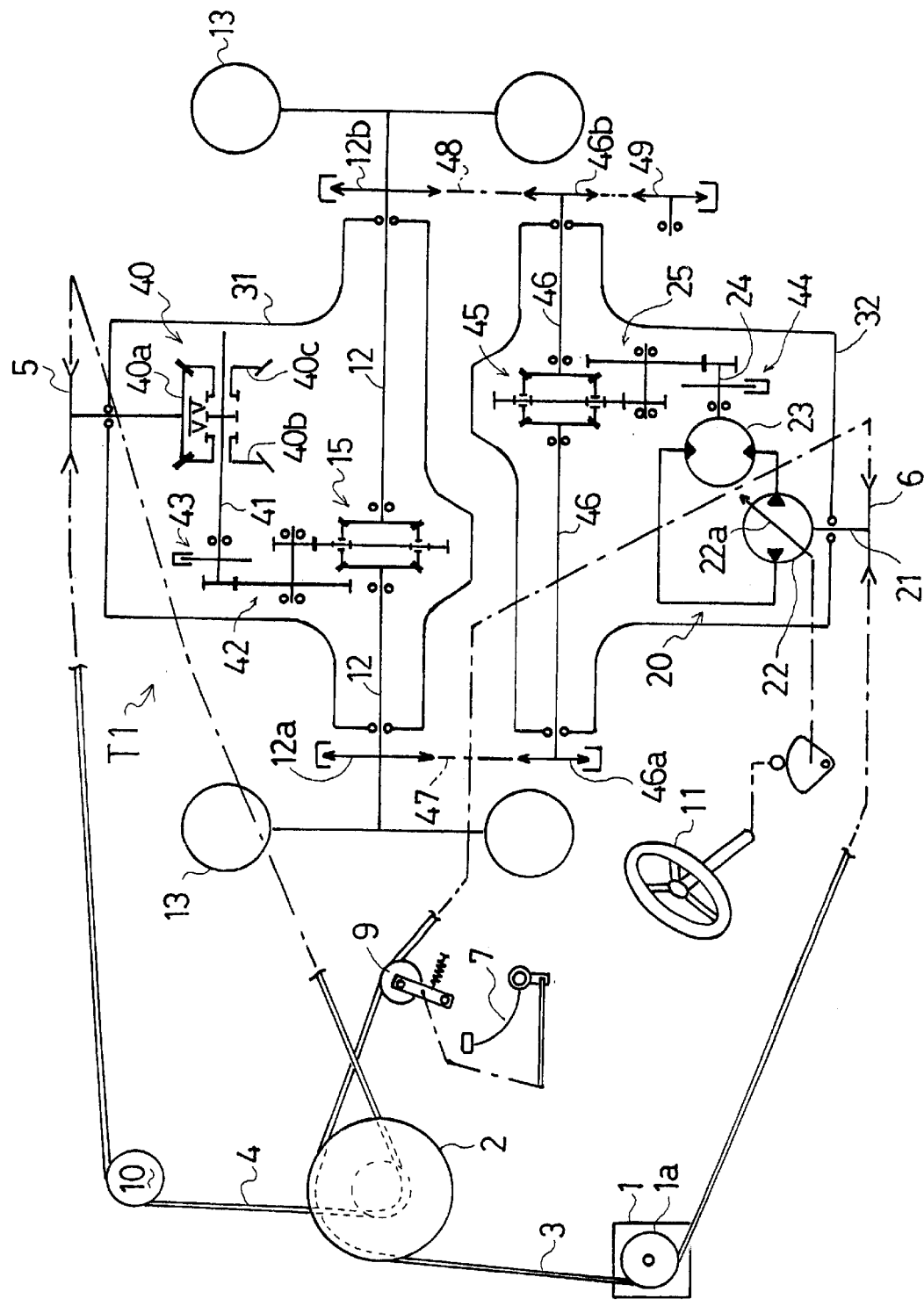
FIG. 3 is a diagram of an embodiment of axle driving apparatus T1 in combination with the belt type transmission.

As shown in FIG. 3 and others, each of the preferred embodiments of axle driving apparatuses T1–T6 uses HST 20 as the steering transmission mechanism. HST 20 comprises a hydraulic pump 22 and a hydraulic motor 23 fluidly connected with each other. Steering wheel 11 is operatively connected to a movable swash plate 22a of hydraulic pump 22 so as to decide the rotational direction of a motor shaft 24 serving as an output shaft of hydraulic motor 23, thereby deciding whether left or right turning of the vehicle. Also, the operation of steering wheel 11 decides the rotational speed of motor shaft 24 so as to decide the turning radius of the vehicle.

Figure 8:
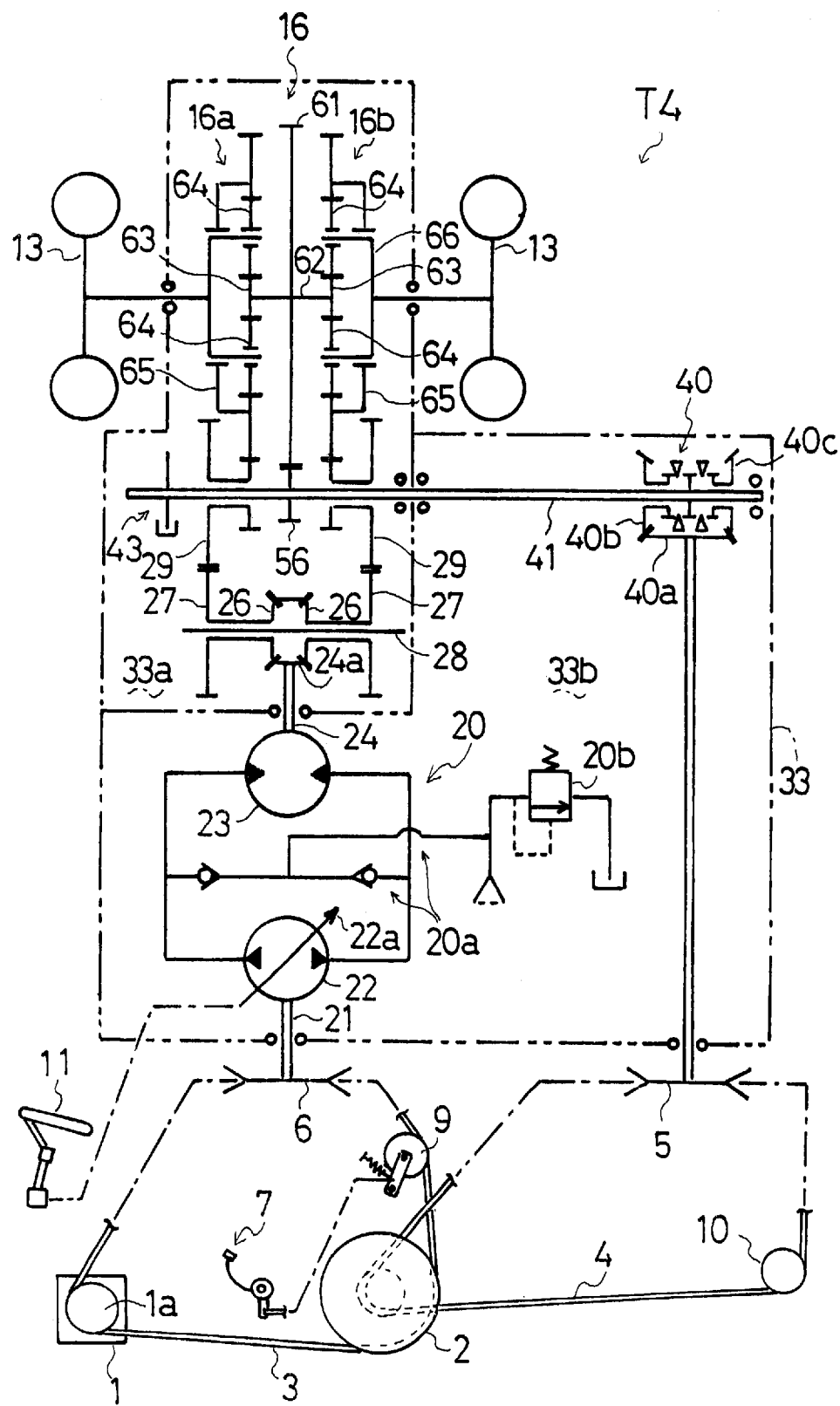
FIG. 8 is a diagram of another embodiment of axle driving apparatus in combination with the belt type transmission.
Figure 11:
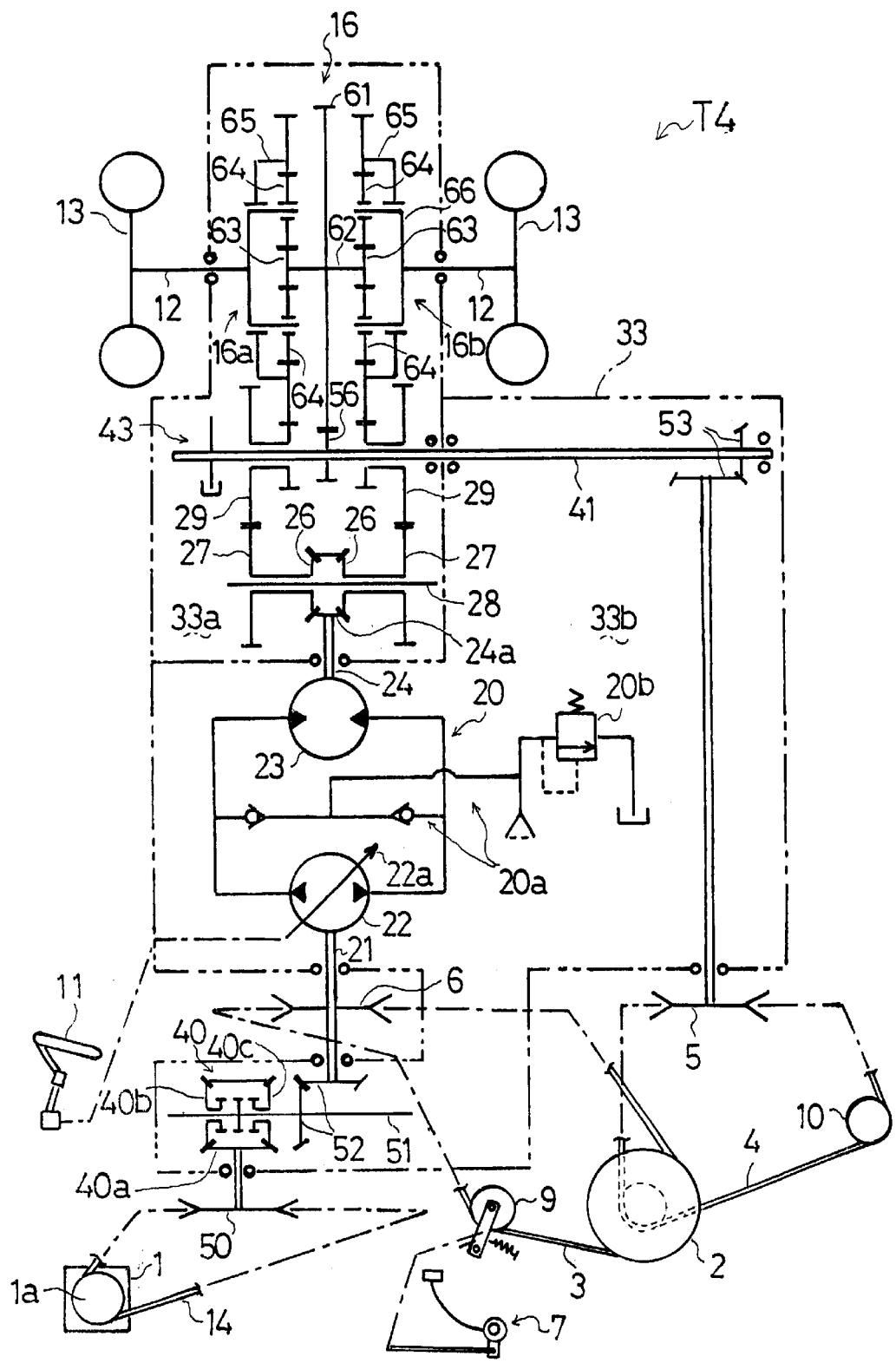
FIG. 11 is a diagram of another embodiment of axle driving apparatus T4 in combination with the belt type transmission.

Incidentally, as shown in FIGS. 8 and 11, an oil feeder circuit 20a with a relief valve 20b may be provided to HST 20. When steering wheel 11 is set in neutral, oil feeder circuit 20a bypasses oil between a pair of oil passages constituting a closed oil circuit between hydraulic pump 22 and hydraulic motor 23. Relief valve 20b may be an electromagnetic control valve which acts according to the operation of steering wheel 11.

Figure 4:
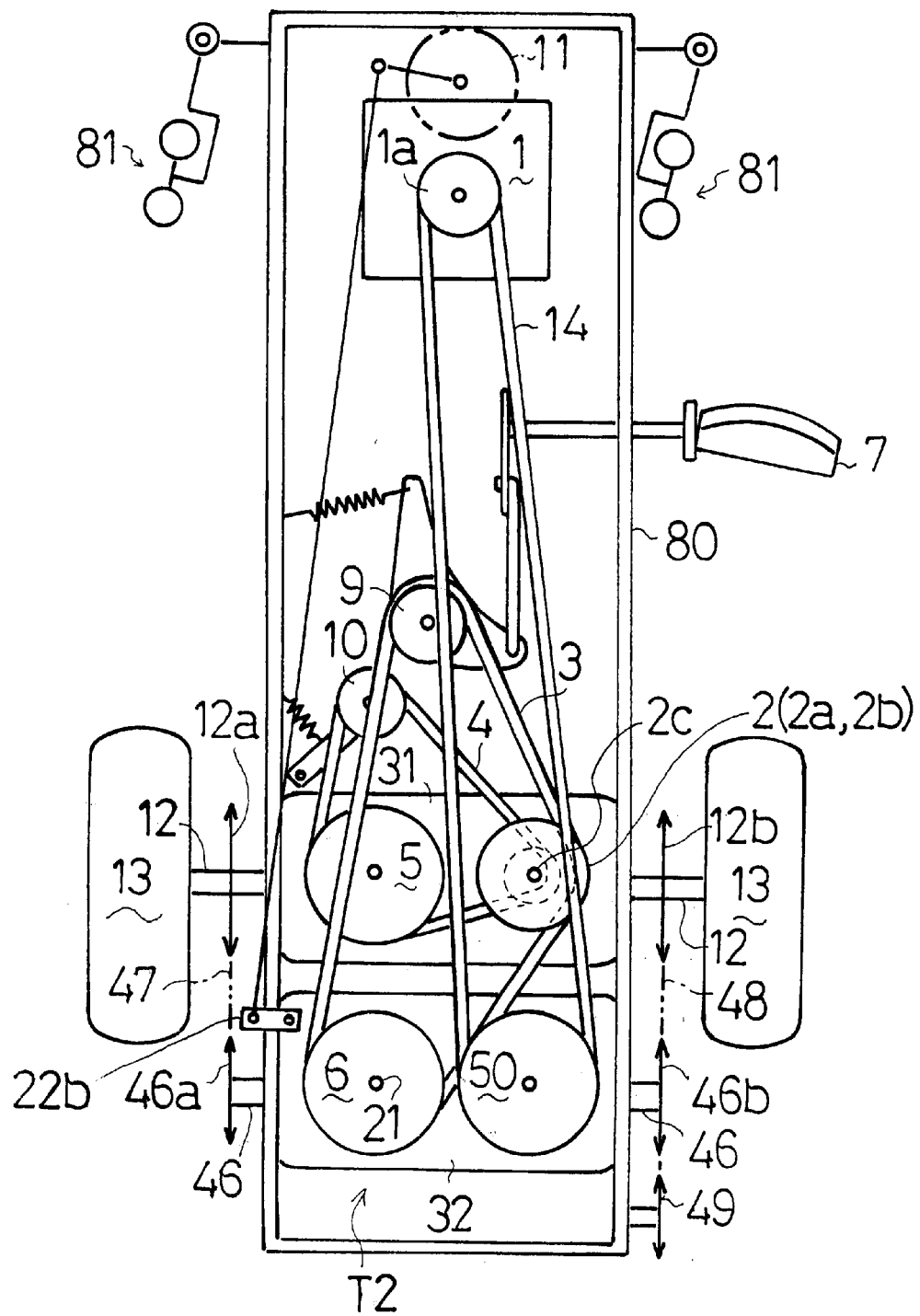
FIG. 4 is a schematic plan view of a vehicle installed with an axle driving apparatus T2 and a belt type transmission according to the present invention.

A pump shaft 21 as a drive shaft of hydraulic pump 22 is fixedly provided thereon with a pulley 6. With regard to axle driving apparatuses T1, T3 and T5, first belt 3 is looped over pulley 6, so that pulley 6 serves as an input pulley of HST 20, as shown in FIGS. 1, 4 and 12. Since the rotational speed of crankshaft pulley 1a is constant, pulley 6 is rotated at a constant speed. More specifically, each of axle driving apparatuses T1, T3 and T5 comprises the steering transmission mechanism which is driven by the driving force of first belt 3.

Figure 6:
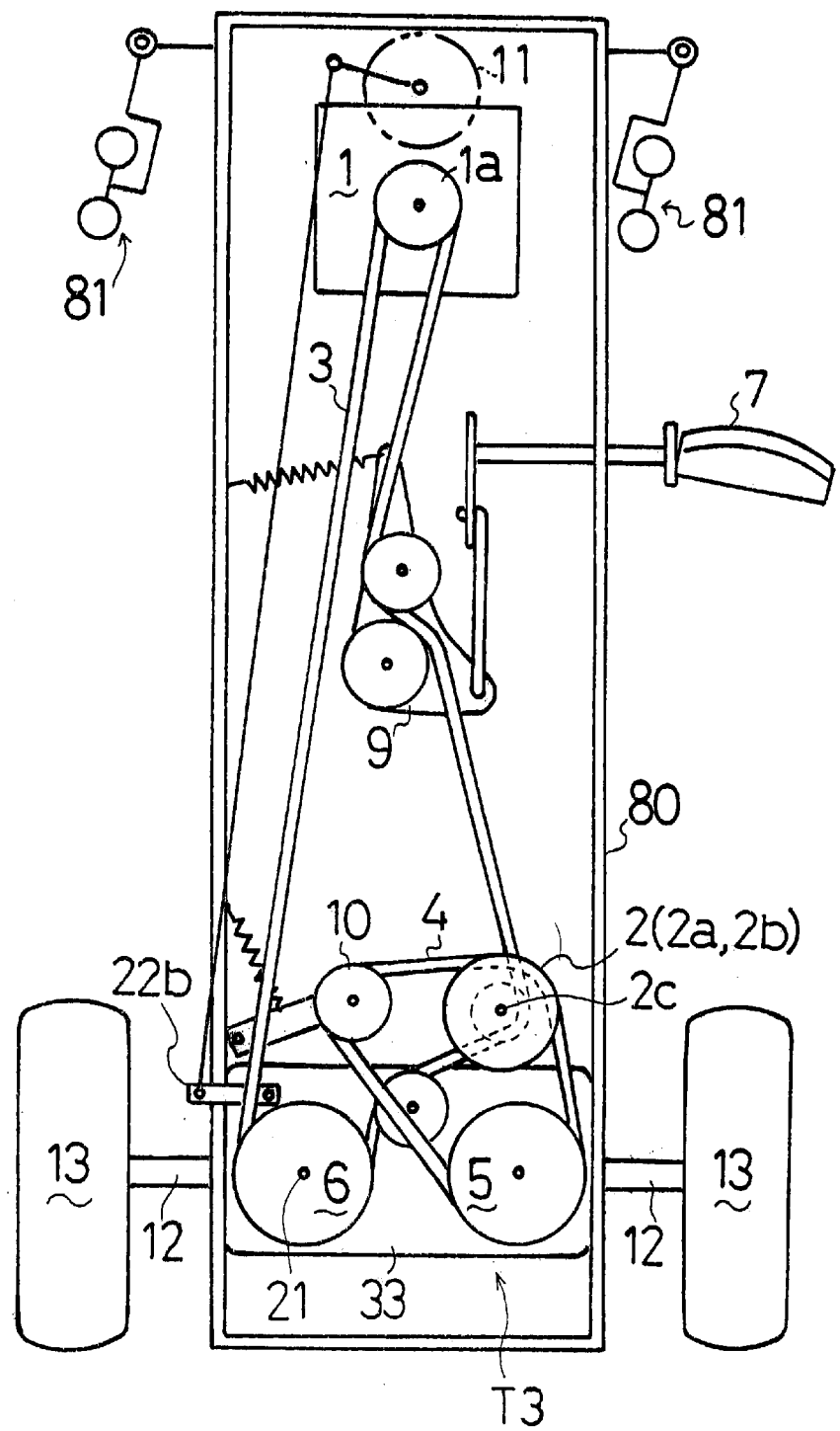
FIG. 6 is a schematic plan view of a vehicle installed with an axle driving apparatus T3 and a belt type transmission according to the present invention.

On the other hand, with respect to axle driving apparatuses T2 and T4, as shown in FIGS. 4 and 6, a common input pulley 50 and a belt 14 are provided for transmitting power of engine 1 to pump shaft 21 so as to drive HST 20. Pulley 6 fixed on pump shaft 21 takes out the rotational force from pump shaft 21 so as to transmit the force to pulley 5 through the belt type stepless transmission comprising belts 3 and 4 and variator 2. More specifically, each of axle driving apparatuses T2 and T4 is provided with common input means such as common input pulley 50 which is shared between the steering transmission mechanism and the belt type transmission.

Configurations for switching the traveling direction of a vehicle between forward and backward will be described. In correspondence to accelerator pedal 7, each of the preferred embodiments of axle driving apparatuses T1, T2, T3, T4 and T6 comprises a forward/backward traveling directional switching clutch unit 40 (hereinafter, "reverser 40").

Figure 13:
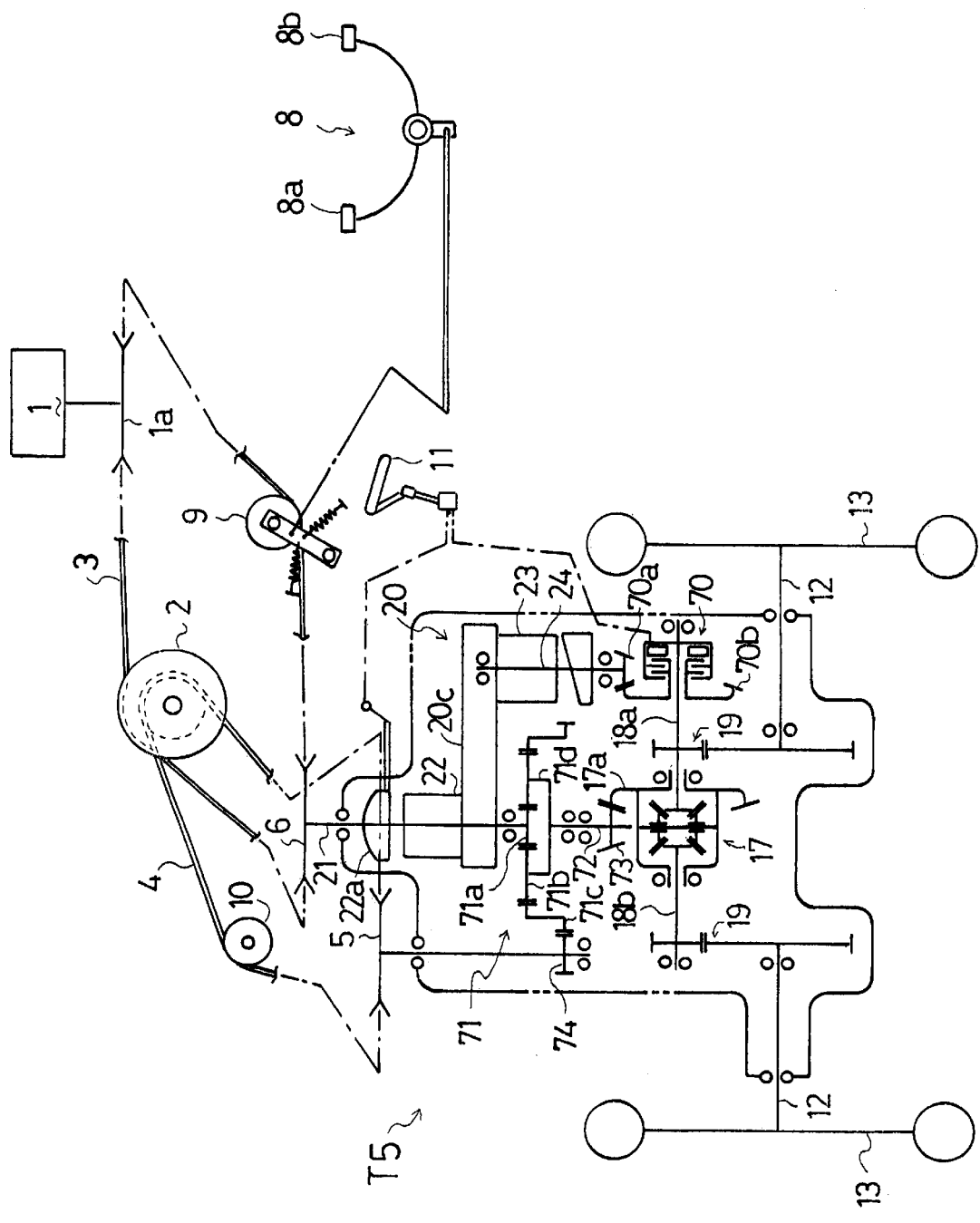
FIG. 13 is a diagram of a first embodiment of axle driving apparatus T5 in combination with the belt type transmission.
Figure 14:
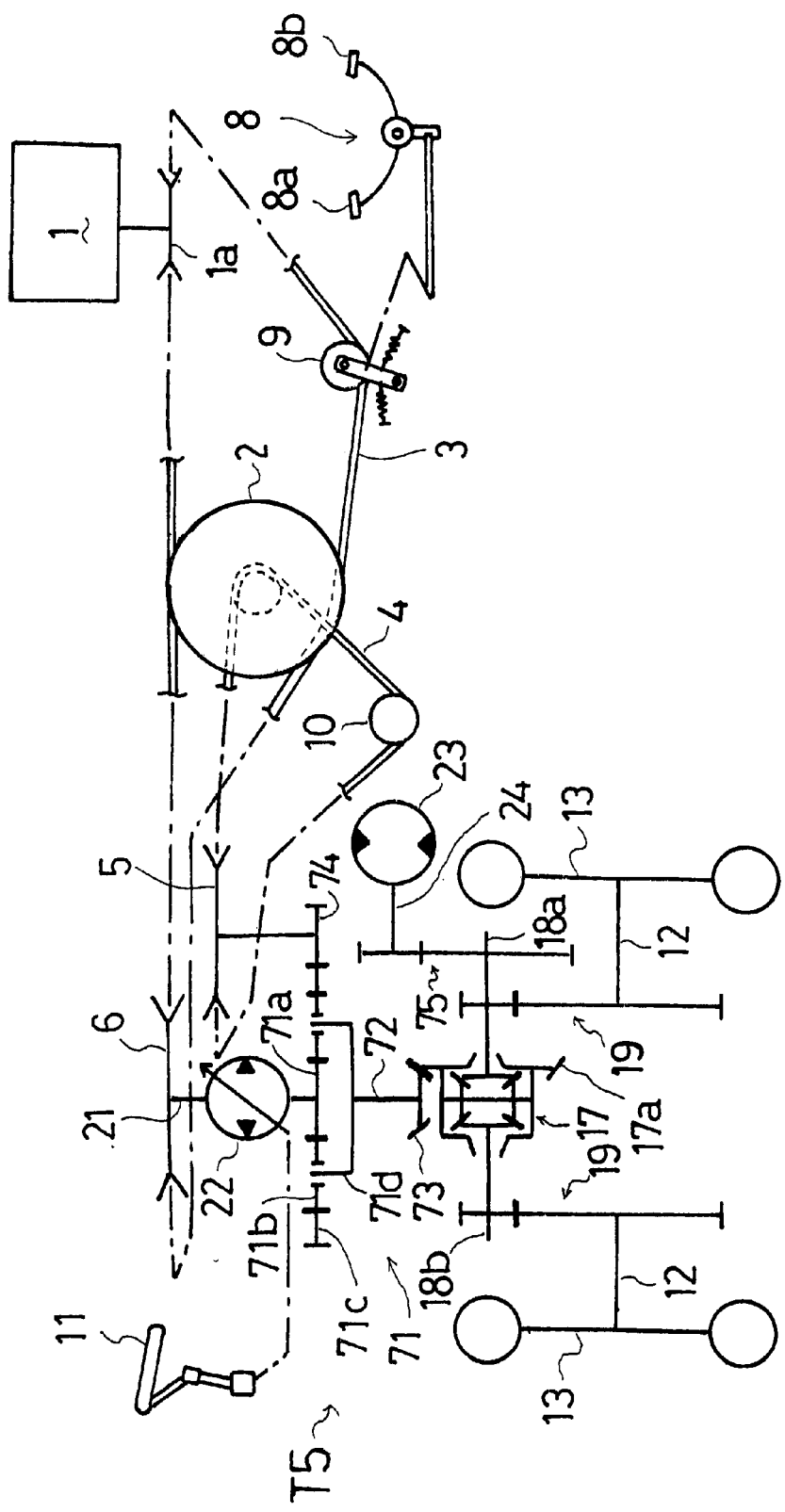
FIG. 14 is a diagram of a second embodiment of axle driving apparatus T5 in combination with the belt type transmission.
Figure 15:
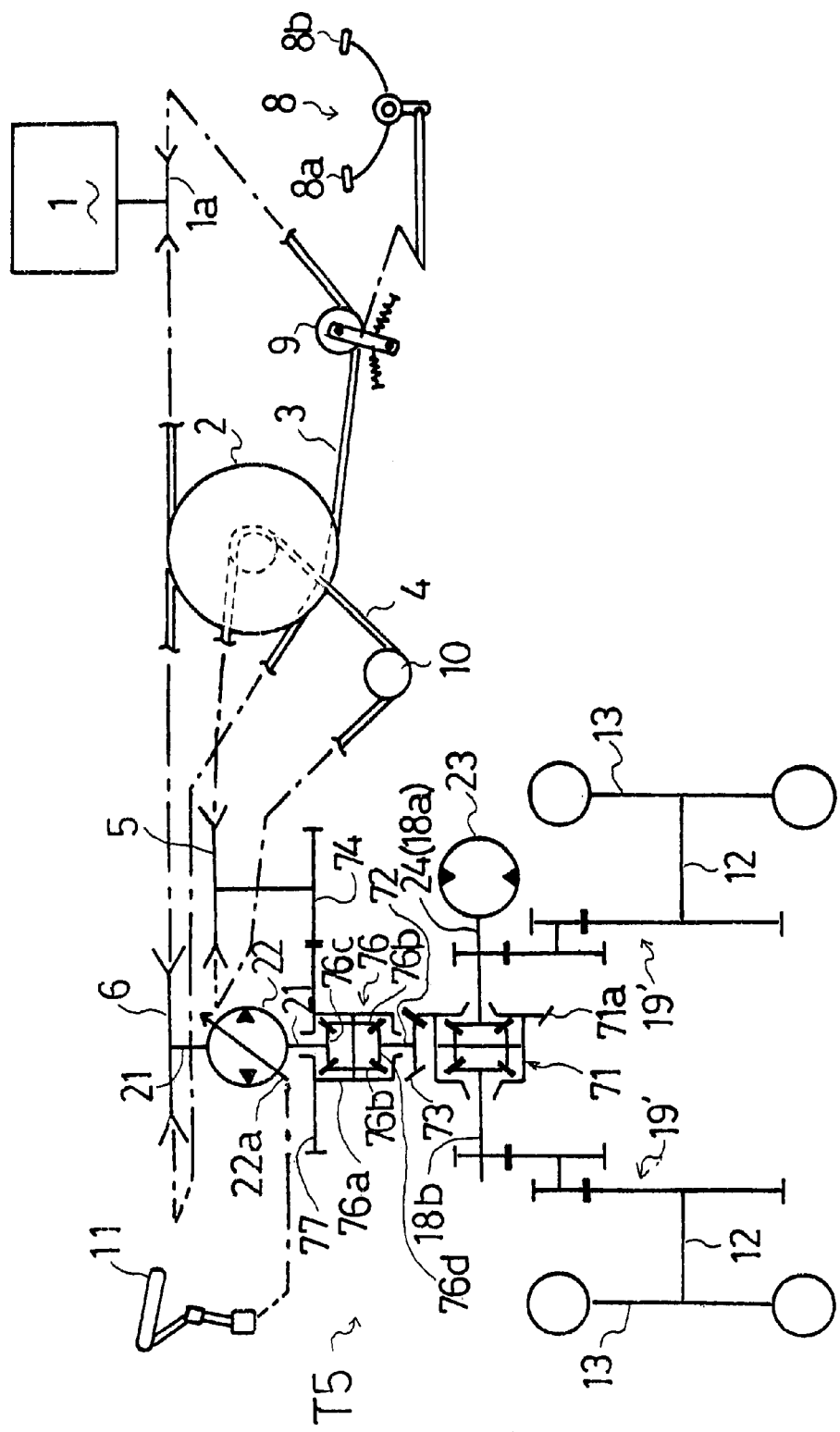
FIG. 15 is a diagram of a third embodiment of axle driving apparatus T5 in combination with the belt type transmission.

As shown in FIG. 12, the vehicle having axle driving apparatus T5 is provided with seesaw-like accelerator pedal 8 provided on opposite ends thereof with a forward accelerator pedal portion 8a and a backward accelerator pedal portion 8b, which replaces accelerator pedal 7. Referring to FIGS. 13 to 15, in correspondence to accelerator pedal 8, each embodiment of axle driving apparatus T5 comprises a differential 71 or 76 interposed between pulleys 5 and 6 replacing reverser 40.

Figure 5:
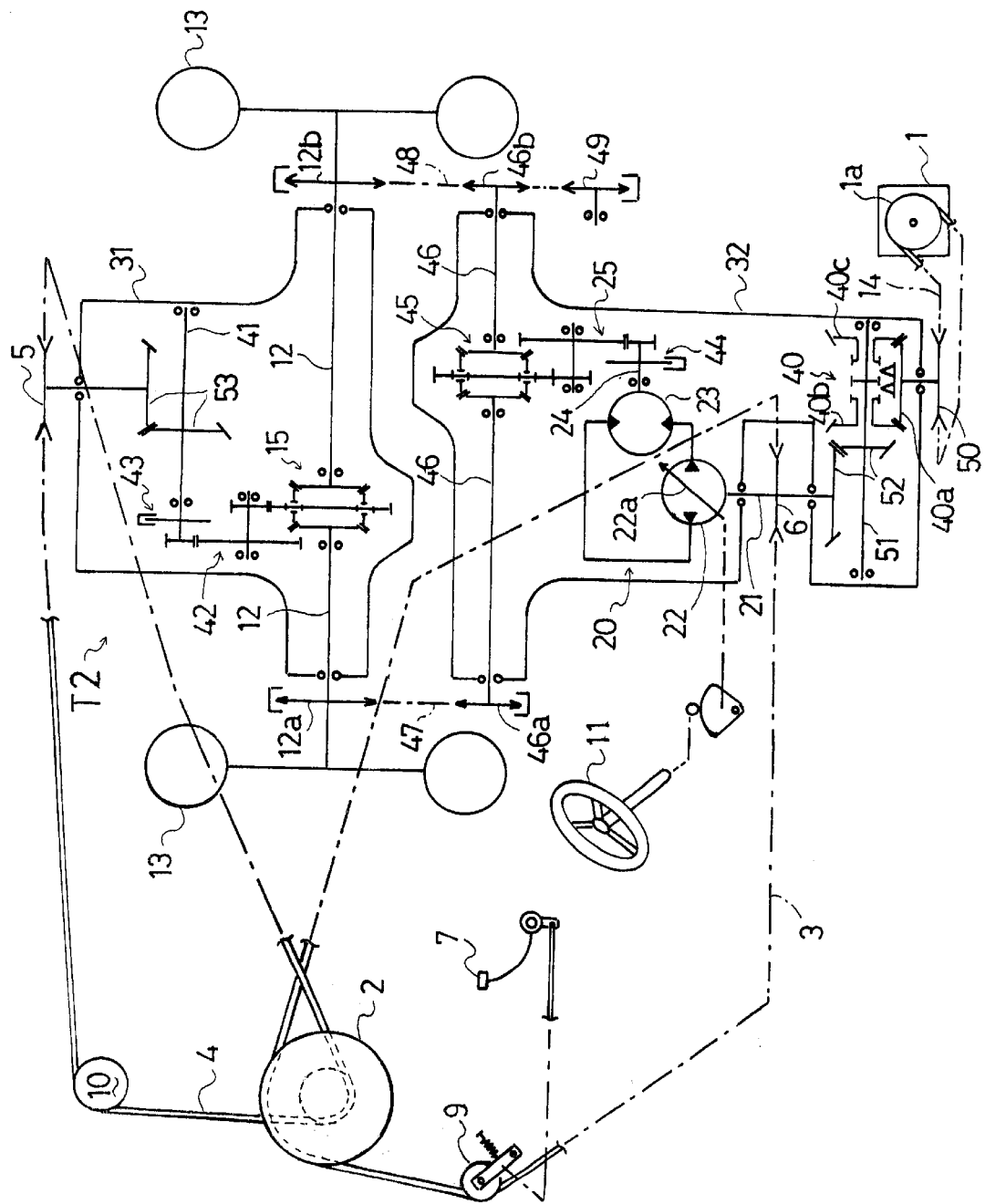
FIG. 5 is a diagram of an embodiment of axle driving apparatus T2 in combination with the belt type transmission.

Referring to FIGS. 3 and 5, embodiments of axle driving apparatuses T1 and T2 shown in FIGS. 1 and 4 will be described. A bevel gear type differential 15 serving as the differential mechanism differentially connecting axles 12 is contained in an axle housing 31 supporting axles 12, and HST 20 serving as the steering transmission mechanism is contained in a steering transmission housing 32 which is separate from axle housing 31.

In steering transmission housing 32, motor shaft 24 is drivingly connected through a gear train 25 to a bevel gear type steering differential unit 45 (hereinafter, "steering differential 45") which differentially connecting a pair of steering differential output shafts 46 (hereinafter, "shafts 46"). Shafts 46 are journalled by steering transmission housing 32 in parallel to axles 12. As illustrated, a brake 44 may be provided on motor shaft 24.

On one exterior side of steering transmission housing 32, a sprocket 46a is fixed to one of shafts 46, and a chain 47 is interposed between sprocket 46a and a sprocket 12a fixed on corresponding one of axles 12 so as to rotate sprockets 46a and 12a in the same direction. Accordingly, if the rotation of motor shaft 24 is directed to rotate shaft 46 in the same rotational direction of axle 12, the rotational force of sprocket 46a accelerates sprocket 12a, thereby accelerating axle 12. If the rotational force of motor shaft 24 is oppositely directed, the rotational force of shaft 46 and that of sprocket 12a are applied onto sprocket 46a against each other so as to decelerate sprocket 12a, thereby decelerating axle 12.

On the opposite exterior side of steering transmission housing 32, a sprocket 46b is fixed to the other shaft 46, and a chain 48 looped over an idler sprocket 49 is interposed between sprocket 46b and a sprocket 12b fixed on the other axle 12 so as to rotate sprockets 46b and 12b in opposite directions. Accordingly, if the rotation of motor shaft 24 is directed to rotate shaft 46 in the same rotational direction of axle 12, the rotational force of shaft 46 and that of sprocket 12b are applied onto sprocket 46b against each other so as to decelerate sprocket 12b, thereby decelerating axle 12. If the rotational force of motor shaft 24 is oppositely directed, the rotational force direction of shaft 46 and that of sprocket 12b which are applied on sprocket 46b coincide with each other so as to accelerate sprocket 12b, thereby accelerating axle 12.

Each of sprockets 46a and 46b is diametrically smaller than each of sprockets 12a and 12b so that, if equal forces are applied on axle 12 and shaft 46, the rotational force of sprocket 12a or 12b exceeds that of sprocket 46a or 46b, thereby preventing decelerated axle 12 from being reversed. However, if the rotational force of shafts 46 is increased to some degree so as to make the rotational force of sprockets 46a and 46b exceed that of sprockets 12a and 12b, decelerated axle 12 is reversed.

The diametric ratio between sprockets 46a and 12a equals that between sprockets 46b and 12b so that the increasing degree of rotational speed of one axle 12 equals the decreasing degree of that of the other axle 12.

Alternatively, sprockets 46a, 46b, 12a, 12b and 49 and chains 47 and 48 are replaceable gear trains. Furthermore, separate housings 31 and 32 may be replaced with one housing in which differential 15, HST 20 and the like are disposed together.

Referring to FIG. 3, in axle housing 31, reverser 40 is provided on a transmission shaft 41 serving as a clutch shaft so as to transmit the rotational force of pulley 5 to differential 15 through a gear train 42. Reverser 40 comprises a bevel input gear 40a, a pair of bevel clutch gears 40b and 40c. Input gear 40a is fixed with pulley 5. Clutch gears 40b and 40c constantly engage with input gear 40a on opposite sides so as to be rotated in opposite directions. Either clutch gear 40b or 40c is selectively clutched with transmission shaft 41, thereby rotating transmission shaft 41 in one of the opposite directions. Thus, the rotational force of transmission shaft 41 is transmitted to both axles 12 through gear train 42 and differential 15. Incidentally, as illustrated, a brake 43 may be provided on clutch shaft 40d.

However, pump shaft 21 fixed to pulley 6 is rotated in the one fixed direction while axles 12 may be reversed according to the switching of reverser 40. Therefore, for example, if the vehicle traveling backward is to be turned left, steering wheel 11 must be turned rightward in a bad feeling.

Axle driving apparatus T2 shown in FIGS. 4 and 5 employs a reversing logic transmission system for solving the problem of axle driving apparatus T1 shown in FIGS. 1 and 3. That is, reverser 40 is contained in steering transmission housing 32. Input pulley 50 outside steering transmission housing 32 is fixed on input gear 40a of reverser 40. Belt 14 other than belts 3 and 4 is looped over crankshaft pulley 1a and input pulley 50. A clutch shaft 51 with which either clutch gear 40b or 40c is selectively clutched is drivingly connected to pump shaft 21 of HST 20 through bevel gears 52.

In axle driving apparatus T2, pump shaft 21, which is rotated in one fixed direction in axle driving apparatus T1 of FIGS. 1 and 3, is reversed by switching reverser 40. Furthermore, such reversible pump shaft 21 is shared between HST 20 and first belt 3. That is, by switching reverser 40, the rotational direction of hydraulic pump 22 of HST 20 is reversed, and simultaneously, the driving direction of belts 3 and 4 which receive their driving force from pump shaft 21 through pulley 6 fixed onto pump shaft 21 is reversed, thereby reversing pulley 5. Therefore, for example, if the vehicle is going to turn left, steering wheel 11 may be turned leftward whether the vehicle travels forward or backward.

Description will now be given of axle driving apparatuses T3 and T4 and preferred embodiments thereof in accordance with FIGS. 6 to 11. Unless being referred to specifically, each of the embodiments employs constructions and parts which are identical or similar to those of FIGS. 1 to 5.

Figure 7:
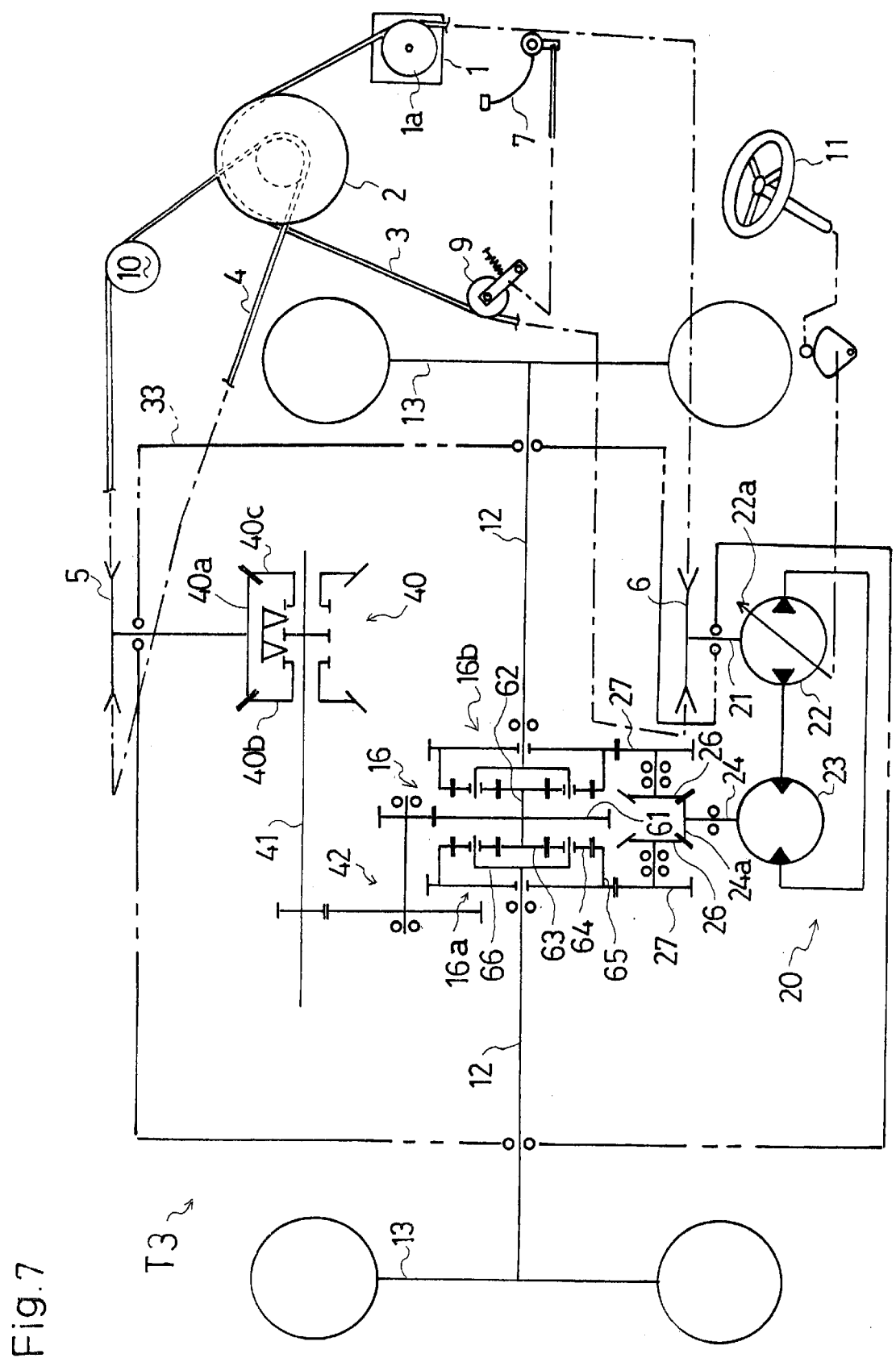
FIG. 7 is a diagram of an embodiment of axle driving apparatus T3 in combination with the belt type transmission.
Figure 9:
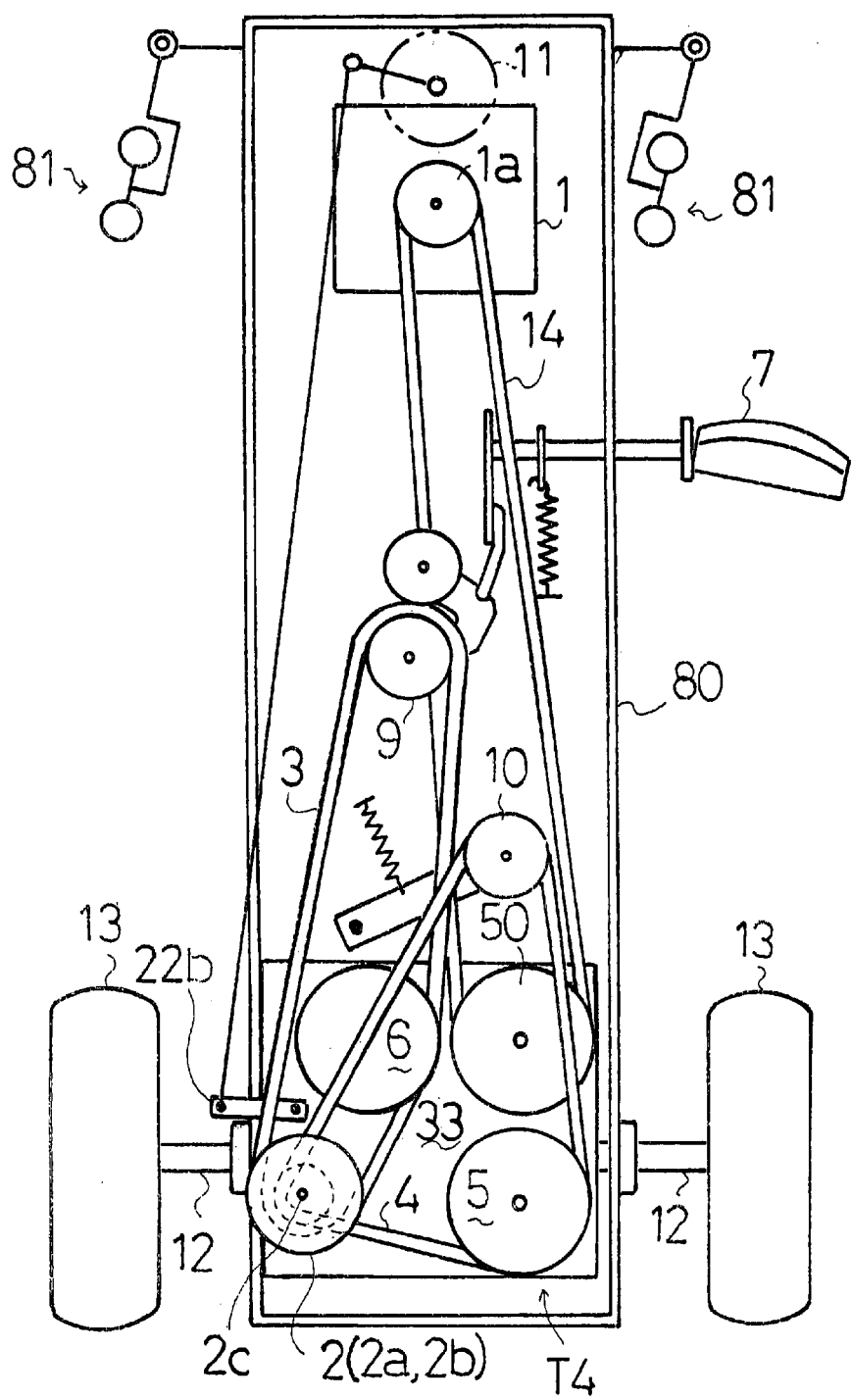
FIG. 9 is a schematic plan view of a vehicle installed with an axle driving apparatus T4 and a belt type transmission according to the present invention.
Figure 10:
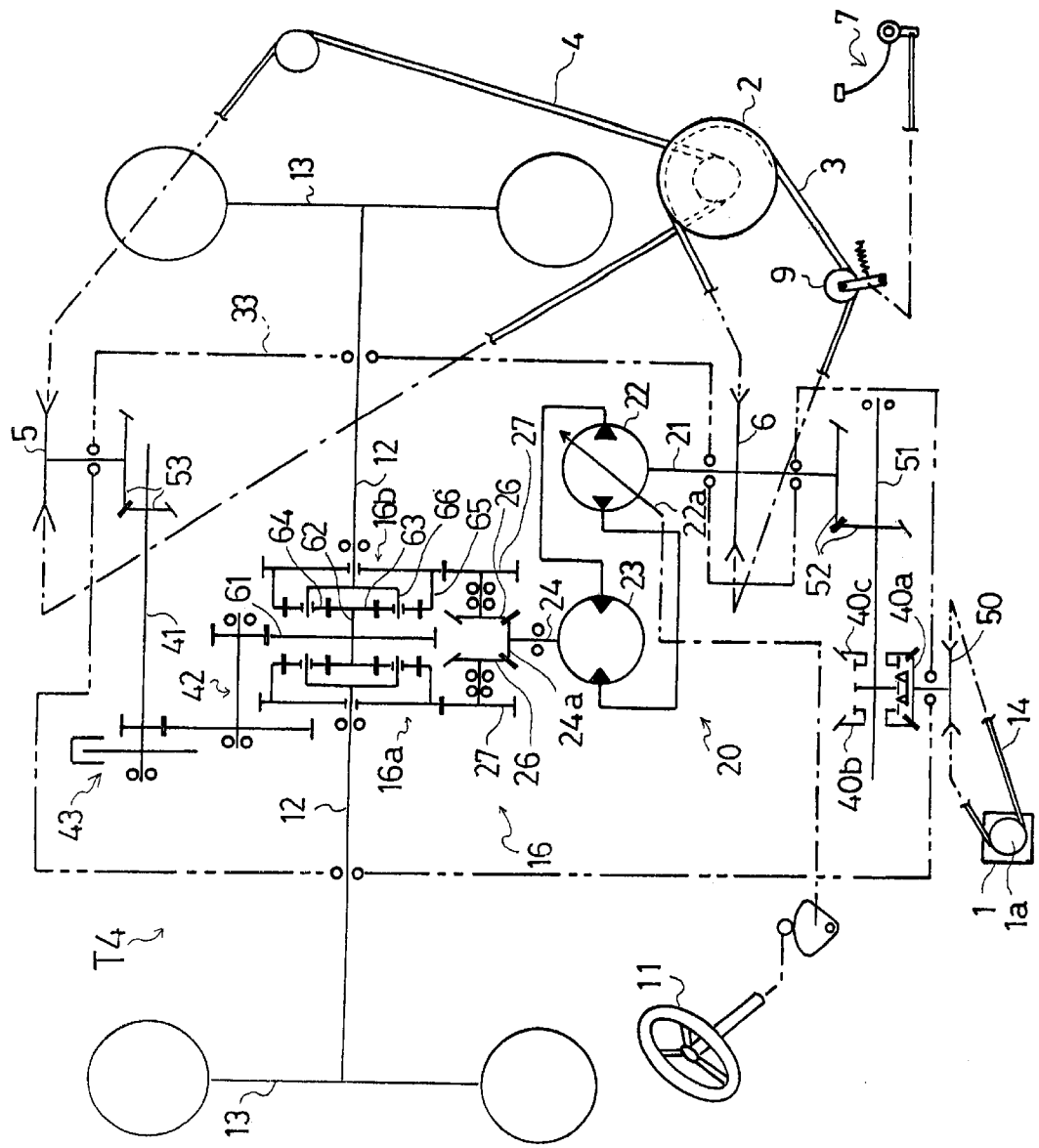
FIG. 10 is a diagram of an embodiment of axle driving apparatus T4 in combination with the belt type transmission.

Referring to FIGS. 6 to 11, HST 20 serving as the steering transmission and a planetary gear type differential 16 serving as the differential mechanism differentially connecting axles 12 to each other are disposed in a housing 33 supporting axles 12. Variable-speed pulley 5 is drivingly connected with transmission shaft 41 through reverser 40 (as shown in FIGS. 7 and 8) or bevel gears 53 (as shown in FIGS. 10 and 11), so as to transmit the driving force of second belt 4 to differential 16.

As mentioned above, pulley 6 is fixed to pump shaft 21 of HST 20. Pulley 6 of axle driving apparatus T3, as shown in FIGS. 6 to 8, is provided for transmitting power from first belt 3 to pump shaft 21, thereby serving as an input pulley of HST 20. Pulley 6 of axle driving apparatus T4, as shown in FIGS. 9 to 11, is provided for transmitting power of pump shaft 21 to first belt 3, thereby serving as a pulley for driving differential 16 through the belt type stepless transmission comprising belts 3 and 4 and variator 2.

Differential 16 comprises a pair of opposite planetary gear units 16a and 16b. Planetary gear units 16a and 16b include respective sun gears 63 which are fixed to each other through a center shaft 62. An input gear 61 is fixed on center shaft 62 between planetary gear units 16a and 16b. Referring to FIGS. 7 and 10, input gear 61 is drivingly connected with transmission shaft 41 through gear train 42, similarly with FIGS. 3 and 5. Referring to FIGS. 8 and 11, input gear 61 directly engages with a gear 56 fixed on transmission shaft 41.

Referring to FIGS. 7, 8, 10 and 11, each of planetary gear units 16a and 16b comprises sun gear 63, planet gears 64, a ring gear 65 and a carrier 66. Ring gear 65 is disposed concentrically with sun gear 63. All planet gears 64 are pivoted onto carrier 66 and engage between sun gear 63 and an inner gear of ring gear 65 so as to be revolved around sun gear 63 according to the difference of rotational speed between sun gear 63 and ring gear 65.

A bevel gear 25 is fixed on motor shaft 24. A pair of opposite bevel gears 26 engage with bevel gear 25 so as to be rotated in opposite directions. Each bevel gear 26 is integrated with each gear 27.

Referring to FIGS. 7 and 10, each gear 27 directly engages with an outer gear of ring gear 65 of each of planetary gear units 16a and 16b.

Referring to FIGS. 8 and 11, bevel gears 26 and gears 27 are freely rotatably provided on a counter shaft 28 disposed in parallel to transmission shaft 41. A pair of opposite double gears 29 are freely rotatably disposed on transmission shaft 41. Each gear 27 engages with the outer gear of each ring gear 65 through each double gear 29.

Furthermore, referring to FIGS. 8 and 11, an interior of housing 33 is divided into a differential chamber 33a and a steering transmission chamber 33b. Chambers 33a and 33b may be constituted by respective housing members. While differential 16 and gear trains comprising gears 25, 26, 27 and 29 are disposed in chamber 33a, HST 20 and reverser 40 are disposed in chamber 33b, thereby being separated from metal dust generated from meshing gears in chamber 33a. Motor shaft 24 of HST 20 and transmission shaft 41 are extended from chamber 33b into chamber 33a.

Referring to FIGS. 7 and 8 in correspondence to the combination system between the belt type stepless transmission and axle driving apparatus T3 shown in FIG. 6, first belt 3 looped over pulley 6 and swing pulley 9 is looped over crankshaft pulley 1a, similarly to that of axle driving apparatus T1. Reverser 40 is interposed between pulley 5 and transmission shaft 41.

Referring to FIGS. 10 and 11 in correspondence to the combination system between the belt type stepless transmission and axle driving apparatus T4 shown in FIG. 9, a reverse logic transmission system is employed similarly to axle driving apparatus T2. That is, belt 14 other than belts 3 and 4 is looped over crankshaft pulley 1a and input pulley 50. Clutch shaft 51 is drivingly connected to pump shaft 21 through bevel gears 52. Reverser 40 is interposed between input pulley 50 and clutch shaft 51.

Description will be given of axle driving apparatus T5 and embodiments thereof in accordance with FIGS. 12 to 15. Similarly to axle driving apparatuses T1 and T3, axle driving apparatus T5 has first belt 3 looped over pulley 6 fixed on pump shaft 21 of HST 20 so as to serve as an input pulley of HST 20. However, it has a different point from axle driving apparatuses T1 and T3 that the rotational speed and direction of axles 12 is changed by the difference of rotational speed between pulleys 5 and 6 driving the differential mechanism between axles 12, whereby reverser 40 can be removed.

Referring to FIGS. 13 to 15, seesaw-like accelerator pedal 8 is operatively connected to swing pulley 9. Swing pulley 9 is swung according to the depression of either forward accelerator pedal portion 8a or backward accelerator pedal portion 8b of accelerator pedal 8. Accelerator pedal 8 is biased in opposite directions toward its neutral position wherein the tension of first belt 3 is medium, thereby rotating pulley 5 at its medium speed. While either forward or backward pedal portion 8a or 8b of accelerator pedal 8 is depressed in the vicinity of the neutral position thereof, the medium tension of first belt 3 is almost maintained.

During the shift of accelerator pedal 8 from the maximum depressed position of backward accelerator pedal portion 8b to the maximum depressed position of forward accelerator pedal portion 8a, that is, while the depression degree of backward accelerator pedal portion 8b is decreased from the maximum thereof and then that of forward accelerator pedal portion 8a is increased to the maximum thereof, swing pulley 9 is swung in one direction so as to tighten or slacken first belt 3, thereby increasing or decreasing the tension of first belt 3 between the minimum and the maximum through the above-mentioned medium tension thereof corresponding to a certain depression zone of accelerator pedal 8 including its neutral position. In other words, by swinging swing pulley 9, if first belt 3 is tightened according to increase of the depression degree of forward accelerator pedal portion 8a, first belt 3 is slackened according to increase of the depression degree of backward accelerator pedal portion 8b. Thus, the most depressed position of one of both pedal portions 8a and 8b corresponds to the maximum tension of first belt 3 for the maximum rotational speed of pulley 5, and that of the other corresponds to the minimum tension of first belt 3 for the minimum rotational speed of pulley 5.

Referring to FIGS. 13 to 15, a bevel gear type differential 17 differentially connects a pair of yoke shafts 18a and 18b to each other. Yoke shafts 18a and 18b engage with respective axles 12 through respective deceleration gear trains 19 or 19'. Motor shaft 24 of HST 20 is drivingly connected to one yoke shaft 18a, as shown in FIGS. 13 and 14, or extended as yoke shaft 18a, as shown in FIG. 15, so as to accelerate and decelerate yoke shaft 18a. If yoke shaft 18a is accelerated, the increased rotational force of yoke shaft 18a is applied onto yoke shaft 18b through differential 17 so as to decelerate yoke shaft 18b, that is, reduce the rotational speed of yoke shaft 18b as much as the increased rotational speed of yoke shaft 18a. Thus, a difference of rotational speed is created between yoke shafts 18a and 18b, thereby turning the vehicle left or right.

Referring to FIG. 13, motor shaft 24 is disposed in parallel to pump shaft 21. Particularly, in this embodiment, hydraulic pump 22 and hydraulic motor 23 are mounted to opposite sides of a center section 20b which is formed therein with a closed oil circuit. Motor shaft 24 is drivingly connected to yoke shaft 18a through bevel gears 70a and 70b. A clutch 70 is interposed between bevel gears 70a and 70b. When steering wheel 11 is set in neutral (at a straight traveling position), clutch 70 is disengaged so as to prevent the output force of HST 20 (the rotational force of motor shaft 24) from being applied onto axles 12, thereby securing the straight traveling of the vehicle. When steering wheel 11 is turned to some degree from the neutral position, clutch 70 is engaged. Then, motor shaft 24 is swiftly rotated following the rotation of yoke shaft 18a. If the steering wheel 11 is turned farther, the more the output force of hydraulic motor 23 is applied onto motor shaft 24 so as to accelerate or decelerate motor shaft 24, thereby accelerating or decelerating yoke shaft 18a.

Incidentally, a bypass circuit such as the above-mentioned oil feeder circuit 20a, (see FIGS. 8 and 11) which bypasses oil between the pair of oil passages of the closed oil circuit in center section 20b, may be provided instead of or in addition to clutch 70. The relief valve of oil feeder circuit 20a may be an electromagnetic valve which is controlled according to operation of steering wheel 11. If both clutch 70 and oil feeder circuit 20a are used, oil feeder circuit 20a may act to keep the neutral condition of HST 20 until clutch 70 is turned on, thereby avoiding a shock caused by the output force of HST 20 suddenly applied onto axles 12.

Referring to FIGS. 14 and 15, motor shaft 24 is disposed perpendicularly to pump shaft 21. Therefore, motor shaft 24 can be drivingly connected with yoke shaft 18a through spur gears of a deceleration gear train 75, as shown in FIG. 14, or extended so as to serve as yoke shaft 18a, as shown in FIG. 15.

Figure 16:
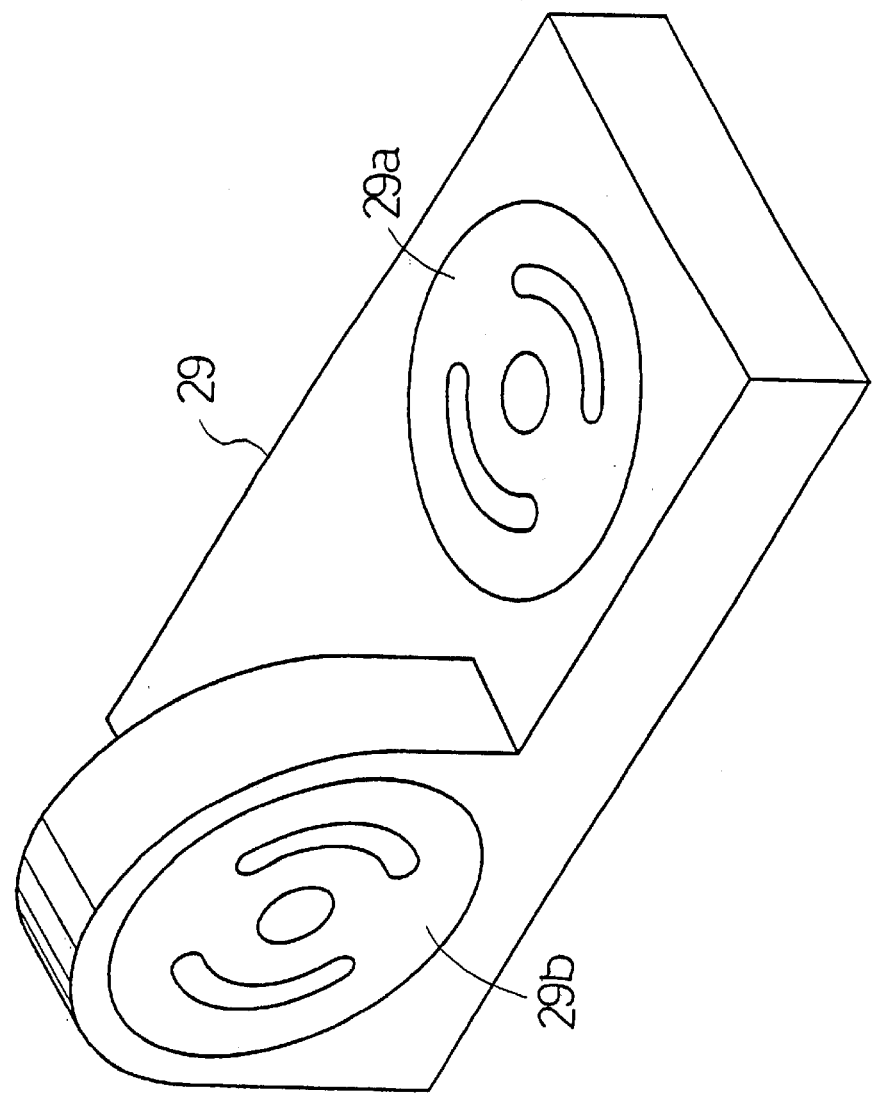
FIG. 16 is a perspective view of a center section for an HST shown in FIG. 14 or 15.
Figure 17:
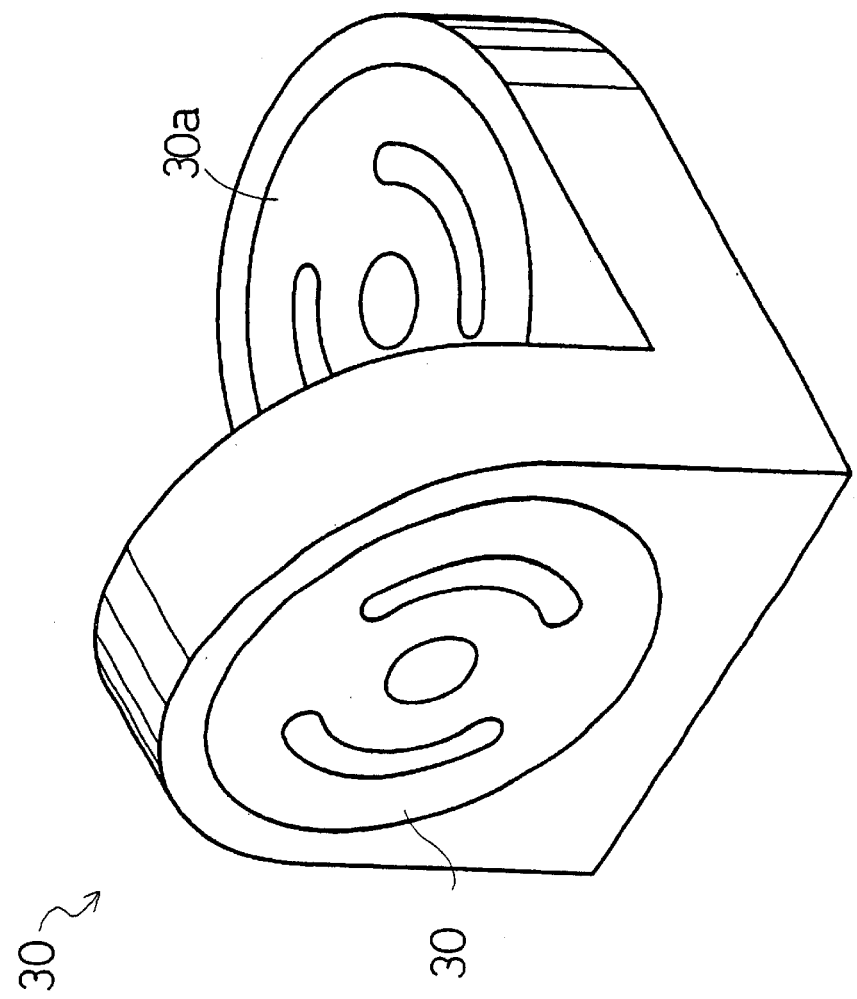
FIG. 17 is a perspective view of another center section for an HST shown in FIG. 14 or 15.

Incidentally, for arranging pump shaft 21 and motor shaft 24 in perpendicular to each other, each of hydraulic pump 22 and hydraulic motor 23 may be mounted onto either a valve surface 29a or 29b formed on a center section 29 as shown in FIG. 16, or onto either a valve surface 30a or 30b formed on a center section 30 as shown in FIG. 17. Center section 29 is d-like shaped when valve surface 29b being viewed in a straight line. Center section 30 is L-like shaped when viewed along any of valve surfaces 30a and 30b.

The rotational speed of motor shaft 24 can be changed by operating steering wheel 11 operatively connected with movable swash plate 22a of hydraulic pump 22.

The driving force into differential 17 for traveling of the vehicle is transmitted from both pulleys 5 and 6. In other words, the difference of rotational speed between pulleys 5 and 6 is used for generate the driving force of differential 17.

Referring to FIGS. 13 and 14, a planetary gear type differential 71 is provided so as to transmit a rotational force generated by the difference of rotational speed between pulleys 5 and 6 to a bevel input gear 17a of differential 17. Differential 71 comprises a sun gear 71a, planet gears 71b, a ring gear 71c and a carrier 71d. Planet gears 71b engage between sun gear 71a and an inner gear of ring gear 71c and are pivoted on carrier 71d. Carrier 71d is integrated with an output shaft 72. A bevel output gear 73 is fixed on output shaft 72 and engages with bevel input gear 17a. Sun gear 71a is fixedly provided on extended pump shaft 21 integrated with pulley 6. An outer gear of ring gear 71c engages with a gear 74 fixedly to pulley 5. The difference of rotational speed between pulleys 5 and 6, i.e., between sun gear 71a and ring gear 71c makes carrier 71d with planetary gears 71b revolve around sun gear 71a, thereby rotating both yoke shafts 18a and 18b through differential 17 in the same direction.

Referring to FIG. 15, a bevel gear type differential 76 replacing differential 71 is interposed between extended pump shaft 21 and output shaft 72. In a differential casing 76a, bevel gears 76c and 76d are fixed on ends of pump shaft 21 and output shaft 72, respectively. Bevel output gear 73 is fixed on the other end of output shaft 72 so as to engage with bevel input gear 17a of differential 17. In differential casing 76a, bevel differential pinions 76b are interposed between bevel gears 76c and 76d and pivoted onto differential casing 76a. Differential casing 76a is integrated with a gear 77 through which extended pump shaft 21 is passed. Gear 77 engages with gear 74 fixed to pulley 5, thereby transmitting the rotational force from pulley 5 to differential casing 76a. Thus, both the rotational forces of pump shaft 21 and differential casing 76a, i.e., those of both pulleys 5 and 6 are applied onto differential pinions 76b so as to drive output shaft 72 in correspondence to the difference of rotational speed between pulleys 5 and 6.

Referring to FIGS. 13 to 15, while pulley 6 is rotated at a constant speed, the rotational speed of pulley 5 is changed by operation of accelerator pedal 8 so as to change the difference of rotational speed between pulleys 5 and 6, i.e., the rotational speed ratio of pulley 5 to pulley 6, thereby changing the traveling speed of the vehicle.

Furthermore, output shaft 72 becomes stationary when the rotational speed ratio of pulley 5 to pulley 6 reaches a certain range. This range corresponds to the neutral zone which is established by the neutral location of accelerator pedal 8. The rotational direction of output shaft 72 in association with the traveling direction of the vehicle depends upon whether the ratio is larger or smaller than the certain range thereof.

Suppose that swing pulley 9 swings so as to tighten first belt 3 during the shift of accelerator pedal 8 from the maximum depression of backward accelerator pedal portion 8b to the maximum depression of forward accelerator pedal portion 8a. According to the depression of forward accelerator pedal portion 8a, the tension of first belt 3 is increased, thereby increasing the rotational speed ratio of pulley 5 to pulley 6 more than the above-mentioned certain range corresponding to the neutral zone, whereby output shaft 72 is rotated in one of opposite directions corresponding to the forward rotation of drive wheels 13. On the contrary, according to the depression of backward accelerator pedal portion 8b, the tension of first belt 3 is decreased, thereby decreasing the rotational speed ratio of pulley 5 to pulley 6 less than the certain range, whereby output shaft 72 is rotated in the other direction corresponding to the backward rotation of drive wheels 13.

Swing pulley 9 may be swung so as to loosen first belt 3 during the shift of accelerator pedal 8 from the maximum depression of backward accelerator pedal portion 8b to the maximum depression of forward accelerator pedal portion 8a, and vice versa.

Figure 18:
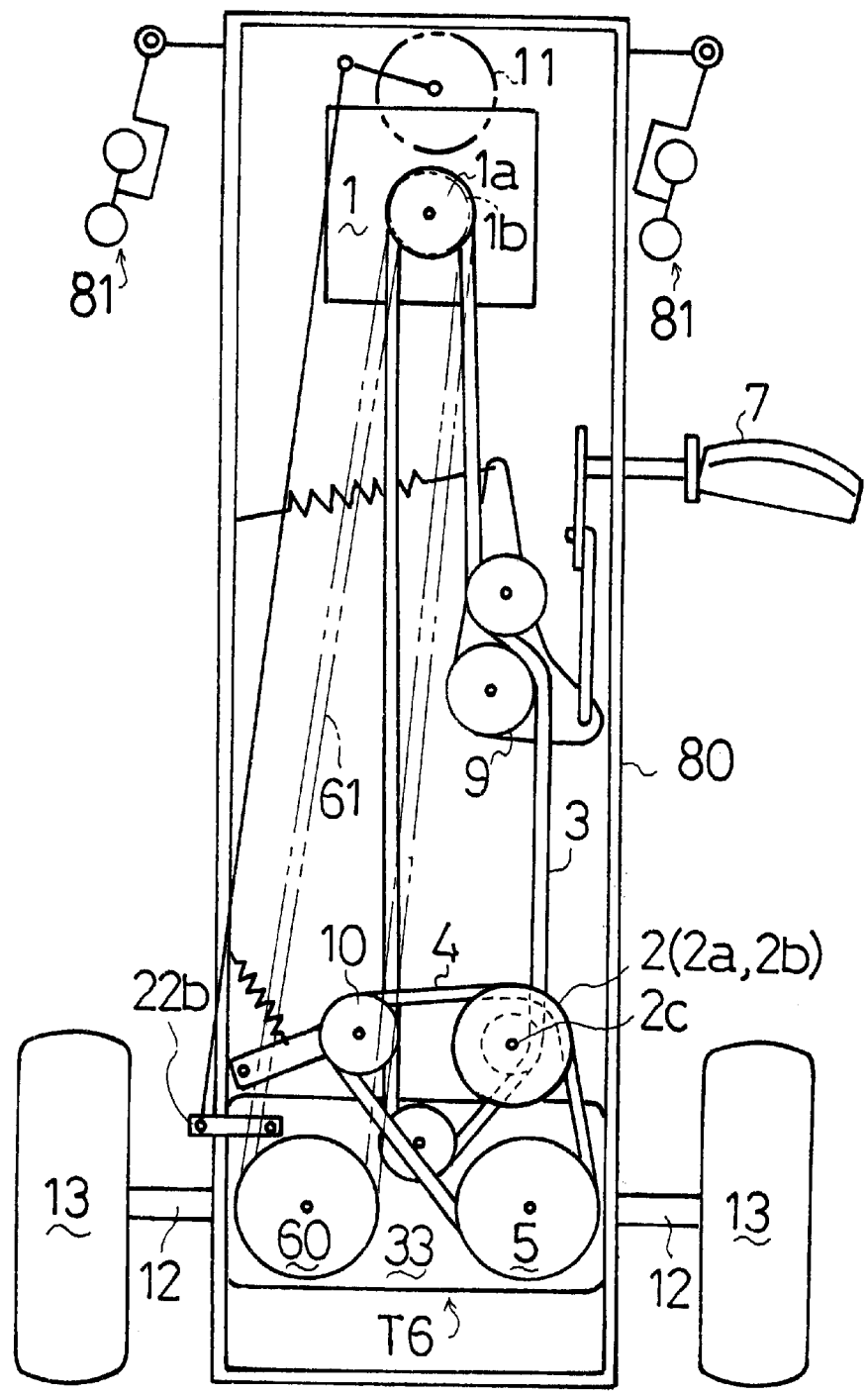
FIG. 18 is a schematic plan view of a vehicle installed with an axle driving apparatus T6 and a belt type transmission according to the present invention.
Figure 19:
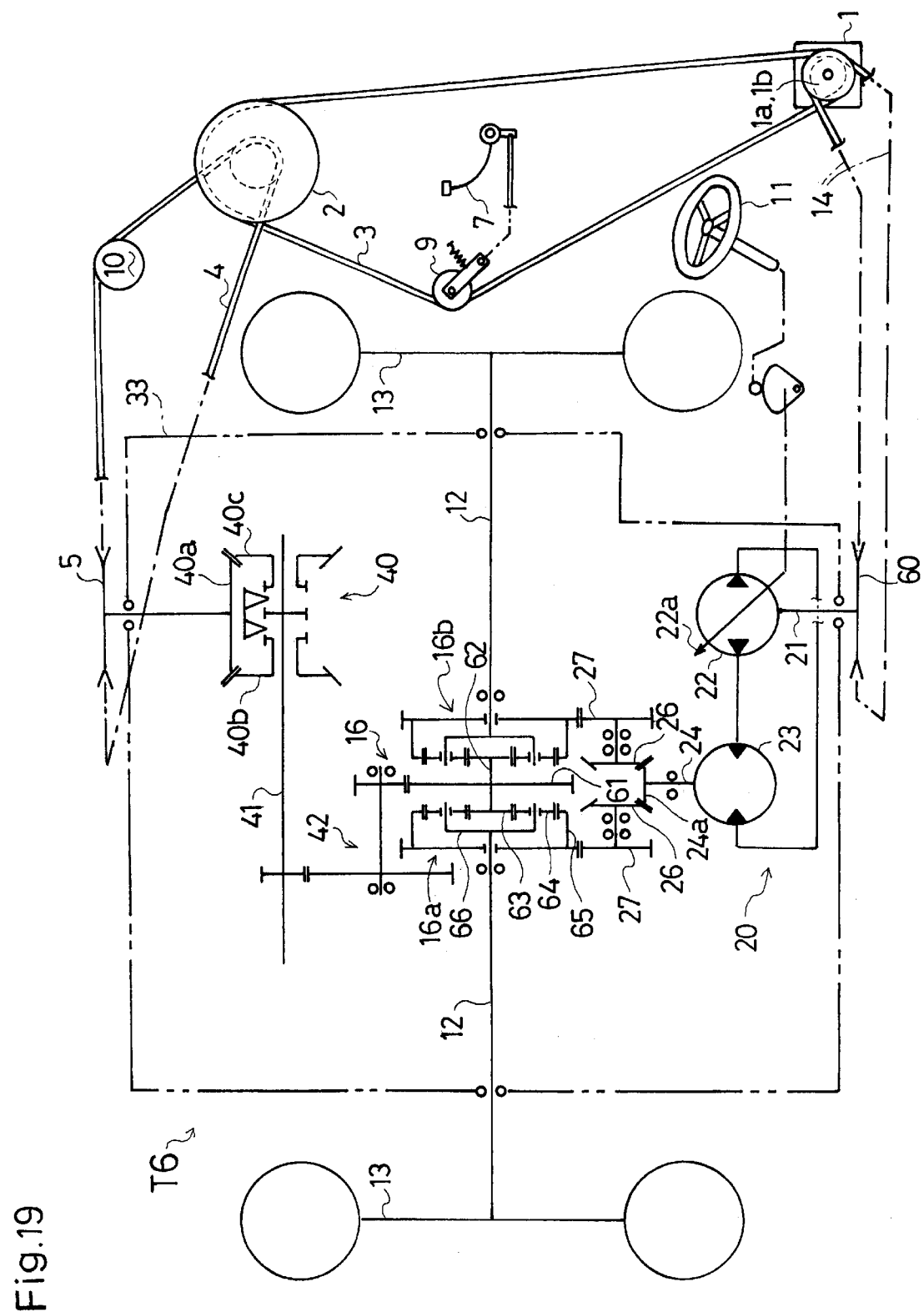
FIG. 19 is a diagram of an embodiment of axle driving apparatus T6 in combination with the belt type transmission.

The vehicle of FIG. 18 is provided with axle driving apparatus T6 which has a steering input pulley 60 serving as an input pulley of the steering transmission mechanism. An embodiment of axle driving apparatus T6 is shown in FIG. 19. Pulley 60 may be typically fixed on a pump shaft 21 of HST 20 serving as the steering transmission mechanism. A belt 61 other than belts 3 and 4 is looped over a pulley on the crankshaft of engine 1 other than crankshaft pulley 1a and over pulley 60. Therefore, power of engine 1 is input to pulley 60 independently of the belt type stepless transmission transmitting the power to pulley 5. Since the rotational speed of the crankshaft is constant, the rotational speed of pulley 60 is constant.

Figure 20:
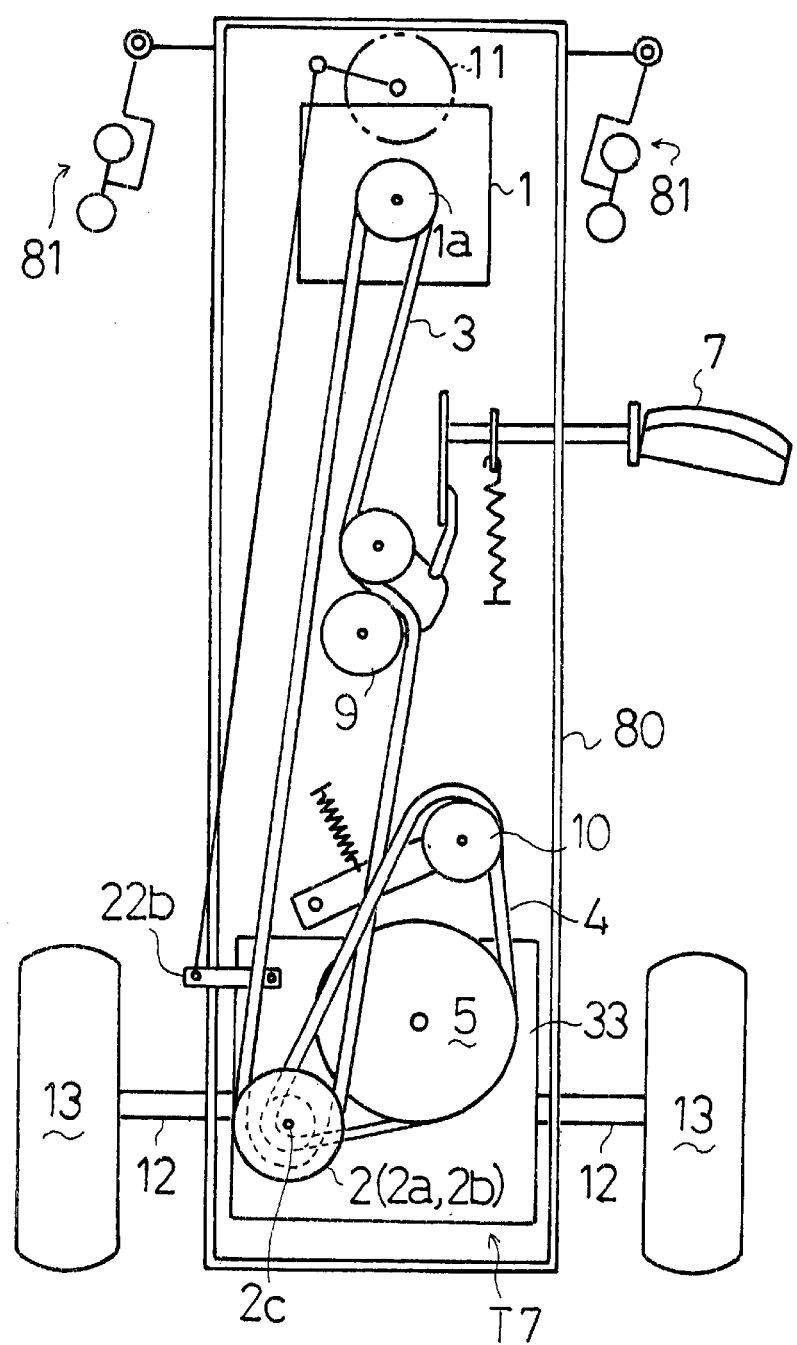
FIG. 20 is a schematic plan view of a vehicle installed with an axle driving apparatus T7 and a belt type transmission according to the present invention.

Referring to FIG. 20, the steering transmission and the propelling transmission mechanism in axle driving apparatus T7 share the rotational force of common pulley 5 looped over second belt 4. Therefore, both the propelling and steering transmission mechanisms are driven by the final output force of the belt type stepless transmission which is adjusted by operation of accelerator pedal 7.

Accordingly, when steering wheel 11 is continuously located at one fixed position thereof, the turn radius of the vehicle can be changed according to the operation of accelerator pedal 7 for changing the traveling speed. Furthermore, in axle driving apparatus T7, the output rotational speeds of the propelling and steering transmission mechanisms which share the torque of pulley 5 vary synchronously with each other according to the speed-variation of pulley 5. If the decelerating output force of the steering transmission mechanism applied onto axle 12 on a turn side of the vehicle is increased by operation of steering wheel 11 so as to achieve and exceed the output force of the propelling transmission mechanism applied thereonto, axle 12 on the turning side of the vehicle becomes stationary and is reversed in its rotational direction. However, by the synchronization of output forces of the steering transmission mechanism and the propelling transmission mechanism, the turning angle of steering wheel 11 for reversing decelerated axle 12 can be constant regardlessly of the traveling speed of the vehicle.

Description will now be given of steerable caster 81 in accordance with FIGS. 21 to 24.

Figure 21:
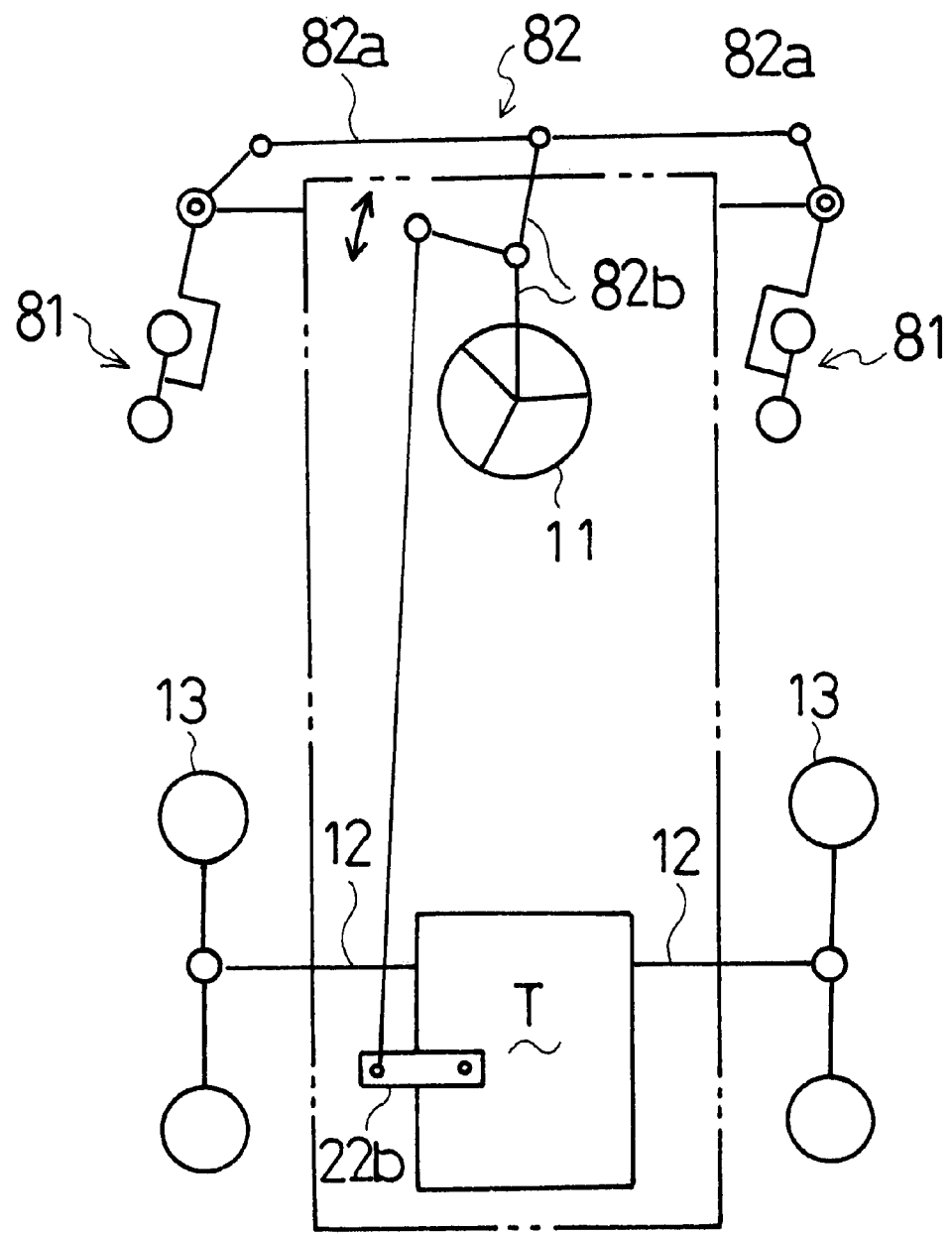
FIG. 21 is a schematic plan view of a vehicle having steerable casters and an axle driving apparatus according to the present invention.

On the assumption of HST 20 serving as the steering transmission mechanism, as shown in FIG. 21, lever 22b is pivoted onto a housing of axle driving apparatus T so as to interlock with movable swash plate 22a of hydraulic pump 22. Steering wheel 11 is operatively connected to lever 22b. Also, as shown in FIG. 21, steering wheel 11 is operatively connected to casters 81 through a steering linkage 82. In the embodiments of FIGS. 1, 4, 6, 9, 12, 18 and 20, steering wheel 11 may be operatively connected to casters 81, also.

Steering linkage 82 comprises left and right tie rods 82a connected to respective carriers 81. A link 82b extended from steering wheel 11 is connected to both tie rods 82a through a rack-and-pinion, a center arm or a power steering cylinder.

Casters 81 may be one or more than two. Anyway, at least one caster 81 is steerable, that is, can be steered by steering wheel 11.

Figure 22:
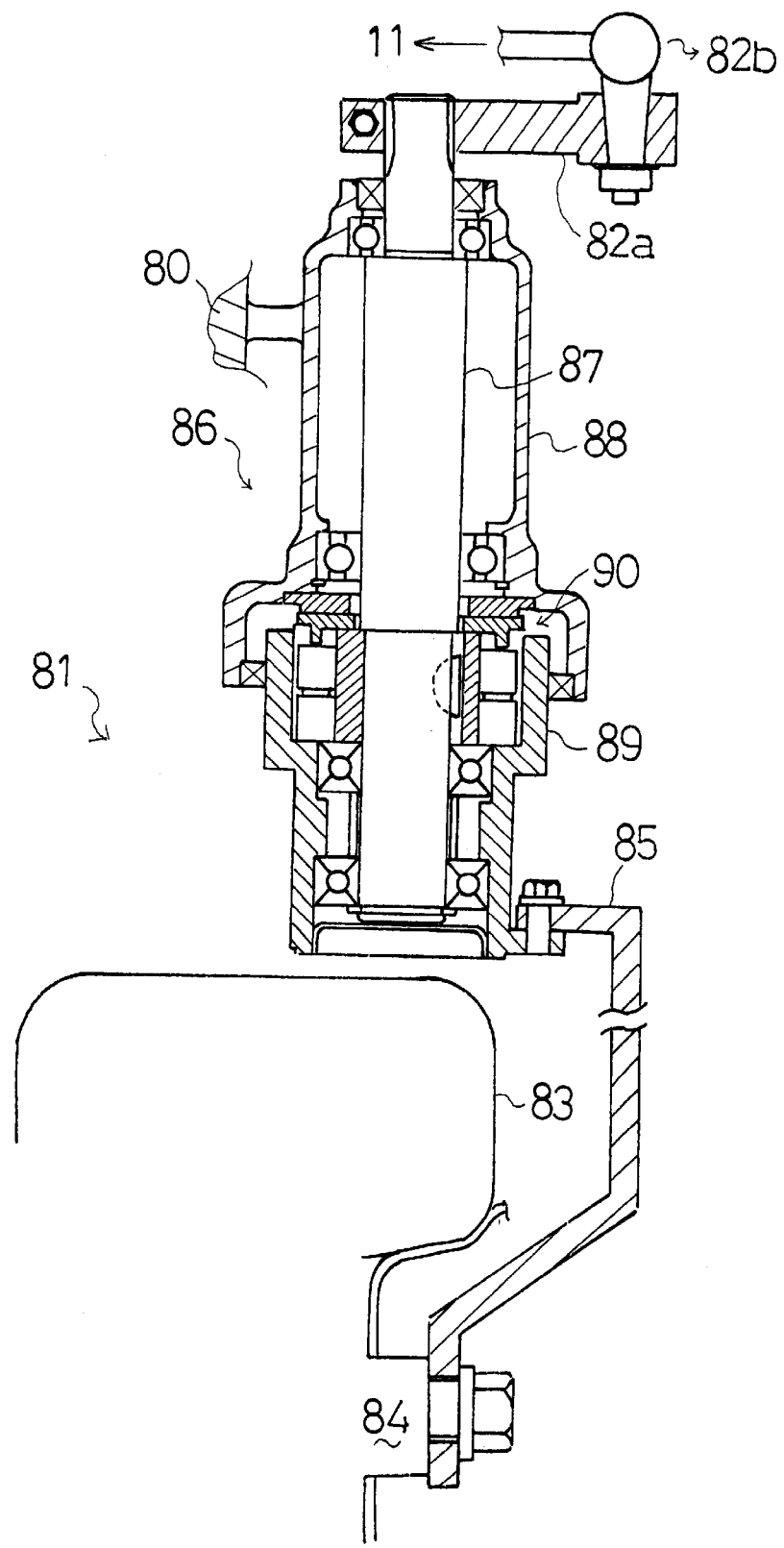
FIG. 22 is a sectional front view of a bi-directional clutch interposed between a tie rod and a caster.

Caster 81 will be described in accordance with FIG. 22. A caster wheel 83 is freely vertically rotatably provided around a horizontal wheel shaft 84 retained by an arm 85. A free type bi-directional clutch 90 is interposed between the top of arm 85 and one end of tie rod 82a other than its end connected to steering wheel 11. Bi-directional clutch 90 allows torque from tie rod 82a generated by operating steering wheel 11 to be transmitted to arm 85, thereby rotating arm 85 together with caster wheel 83 laterally. On the contrary, bi-directional clutch 90 prevents torque from arm 85 generated by grounding of caster wheel 83 from being transmitted to steering wheel 11 through tie rod 82a while arm 85 together with caster wheel 83 is allowed to rotate laterally.

A lower end of a lower casing 89 is fixed to the top of arm 85. An upper casing 88 is disposed upwardly from lower casing 89 and fixed to a vehicle body. A lower end of upper casing 88 and an upper end of lower casing 89 are relatively rotatably fitted with each other. A swing shaft 87 is disposed axially in upper and lower casings 88 and 89 and journalled by casings 88 and 89. Swing shaft 87 is disposed vertically when viewed in the longitudinal direction of the vehicle. A top of swing shaft 87 projects upward from upper casing 88 so as to be fixed to the one end of tie rod 82a.

Bi-directional clutch 90 is interposed among swing shaft 87 and upper and lower casings 88 and 89. Bi-directional clutch 90 may be clutched on and off by an electromagnetic valve which is controlled according to the motion of steering wheel 11 or so on. Bi-directional clutch 90 may be replaced with a one-way clutch, a torque diode or so on.

When bi-directional clutch 90 is switched on, lower casing 89 is integrated with swing shaft 87. Thus, by operating steering wheel 11 so as to rotate swing shaft 87 through tie rod 82a, arm 85 fixed to lower casing 89 is rotated together with swing shaft 87, thereby swinging caster wheel 83 laterally about the vehicle. If bi-directional clutch 90 is switched off, lower casing 89 is rotatable in relative to swing shaft 87, thereby preventing the torque generated by operation of steering wheel 11 from being transmitted to lower casing 89 and arm 85. Thus, even if steering wheel 11 is operated, lateral swing of casters 81 do not strictly react to the operation but react to the traveling condition of the vehicle, the ground condition, and so on.

Whether bi-directional clutch 90 is switched on or off, upper casing 88 is rotatable in relative to swing shaft 87, and bi-directional clutch 90 prevents the torque of lower casing 89 from being transmitted to swing shaft 87. Thus, even if caster wheel 83 receives a sideward force from the ground so as to swing together with arm 85 and lower casing 89 laterally about the vehicle, the torque from the ground is prevented from being transmitted to steering wheel 11, thereby avoiding disturbing the operation of steering wheel 11.

Figure 23:
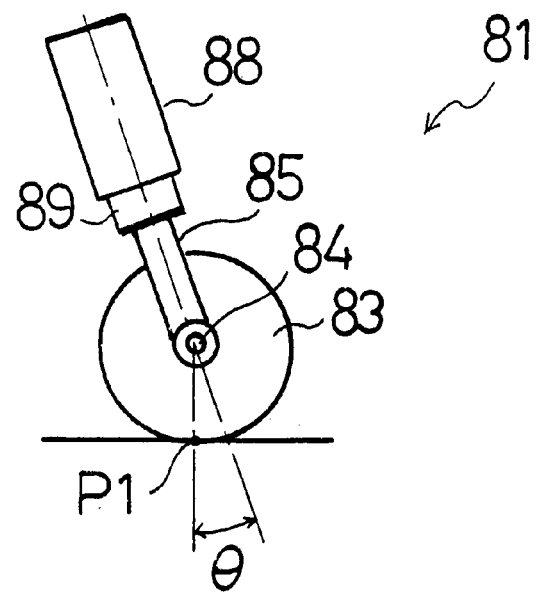
FIG. 23 is a schematic side view of a caster with a caster angle according to the present invention.

Incidentally, as shown in FIG. 23, when viewed in the lateral direction of the vehicle, swing shaft 87 is slanted upwardly forward to some degree from a strictly vertical line so as to make a caster angle 0 for trailing caster wheel 83, thereby facilitating the steering of caster 81. Furthermore, arm 85 is so constructed as to locate wheel shaft 84 at a position where an (extended) axis of swing shaft 87 intersects an (extended) axis of wheel shaft 84.

Figure 24:
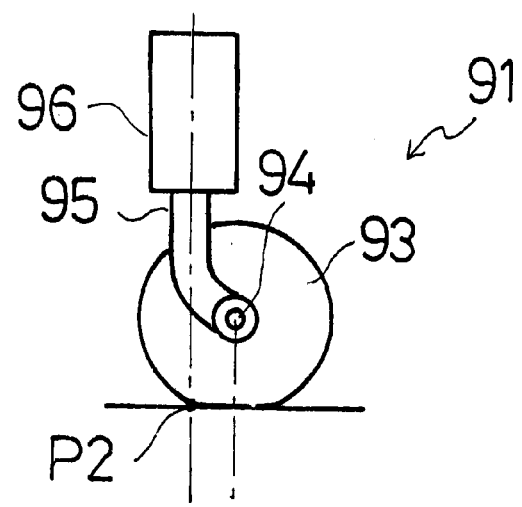
FIG. 24 is a schematic side view of a conventional caster with a caster angle.

Referring to FIG. 24, a conventional unsteerable caster 91 comprises a caster wheel 93, a horizontal wheel shaft 94 serving as an axis of caster wheel 93, an arm 95 retaining wheel shaft 94, and a vertical swing shaft 96 integrated with arm 95. When viewed laterally of the vehicle, swing shaft 96 is still vertical. Arm 95 is curved backward so as to trail caster wheel 93. At a cross point P2 between the extended axis of swing shaft 96 and the ground surface, caster wheel 93 receives the resistant force from the ground the most effectively.

However, wheel shaft 94 is disposed backward from cross point P2. For effectively steering a caster, that is, effectively swinging a caster wheel laterally, it is desirable that the rotational force of a swing shaft for steering the caster is effectively applied onto a wheel shaft so as to overcome the resistant force from the ground. In the construction of FIG. 18, even if caster 91 is steered by steering wheel 11, the rotational force of swing shaft 96 is applied directly downward onto cross point P2 and scarcely applied onto wheel shaft 94. Whereby, caster 91 is hard to be steered.

Referring to FIG. 23 in comparison with FIG. 24, the rotational force of swing shaft 87 is effectively applied onto wheel shaft 84 because the extended axis of swing shaft 87 intersects the axis of wheel shaft 84. Also, caster wheel 83 receives the most effective resistant force from the ground surface at a cross point P1 between a vertical line from wheel shaft 84 and the ground surface. Thus, the steering force generated by operating steering wheel 11 effectively applied onto caster wheel 83 through wheel shaft 84 is sufficient to overcome the resistant force from the ground. In this way, caster 81 can be steered effectively and smoothly.

While the described embodiment represents the preferred form of the present invention, it is to be understood that modification will occur to those skilled in that art without departing from the spirit of the invention. The scope of the invention is therefore to be determined solely by the appended claims.

What is claimed is:

1. An axle driving apparatus for a vehicle having a prime mover and a belt driven stepless transmission, comprising:
   a pair of axles connected to respective drive wheels;
   a propelling transmission mechanism drivingly connected to said prime mover at a variable speed through said belt driven stepless transmission so as to transmit speed-variable output rotation of said belt driven stepless transmission to both said axles, thereby rotating said axles together at various speeds in a common direction selected from two opposite directions for forward and backward traveling of said vehicle;

a steering transmission mechanism drivingly connected to said prime mover at a constant speed so as to transmit two oppositely directive output rotations to said respective axles, thereby differentially rotating said axles at various rotational speeds between said axles;

an accelerator operatively connected to said belt transmission so as to change the output rotational speed of said propelling transmission mechanism; and a steering operation device operatively connected to said steering transmission so as to change the output rotational speed of said steering transmission.

2. The axle driving apparatus as set forth in claim 1, further comprising;
a common housing incorporating said propelling transmission mechanism and said steering transmission mechanism.

3. The axle driving apparatus as set forth in claim 1, further comprising:
at least two housings incorporating said propelling transmission mechanism and said steering transmission mechanism, respectively.

4. The axle driving apparatus as set forth in claim 1, further comprising:
a first differential mechanism differentially connecting said pair of axles to each other, wherein said first differential mechanism transmits the output rotation of said propelling transmission mechanism to both said axles, and allows said axle to be differentially rotated by the oppositely directive output rotations of said steering transmission mechanism transmitted to said respective axles.

5. The axle driving apparatus as set forth in claim 4, further comprising:
a common housing incorporating said propelling transmission mechanism, said steering transmission mechanism, and said first differential mechanism.

6. The axle driving apparatus as set forth in claim 4, further comprising:
at least two housings incorporating said propelling transmission mechanism and said steering transmission mechanism, respectively, wherein said first differential mechanism is incorporated in either the housing incorporating said propelling transmission mechanism or the housing incorporating said steering transmission mechanism.

7. The axle driving apparatus as set forth in claim 4, further comprising:
a second differential mechanism which is driven by said steering transmission mechanism so as to generate two appositely rotational forces applied onto said respective axles.

8. The axle driving apparatus as set forth in claim 1, wherein said steering transmission mechanism comprises a hydrostatic transmission.

9. The axle driving apparatus as set forth in claim 1, further comprising:
a switching device whose output rotational direction is selected from two opposite directions for selecting one of said two oppositely directive output rotations of said propelling transmission mechanism.

10. The axle driving apparatus as set forth in claim 9, wherein said switching device is interposed in a drive train between said belt driven transmission and said pair of axles.

11. The axle driving apparatus as set forth in claim 9, wherein said switching device is interposed between said prime mover and a pulley and a pump shaft shared by said belt driven transmission and said steering transmission mechanism.

12. The axle driving apparatus as set forth in claim 1, said belt driven transmission including:
a first belt which is driven by said prime mover at a speed in proportion to the output rotational speed of said prime mover; and
a second belt which is driven by said prime mover through said first belt.

13. The axle driving apparatus as set forth in claim 12, wherein the driving speed of said first belt is determined according to the output rotational speed of said prime mover and is constant, and a driving speed of said second belt vanes by operation of said accelerator.

14. The axle driving apparatus as set forth in claim 12, wherein said steering transmission mechanism is driven by said first belt.

15. The axle driving apparatus as set forth in claim 12, further comprising:
a common input device drivingly connected to said prime mover, wherein the rotational force of said common input device is shared between said first belt and said steering transmission mechanism.

16. The axle driving apparatus asset forth in claim 1, said belt driven transmission including:
a first belt which is driven by said prime mover and driven at a constant speed determined according to the output rotational speed of said prime mover, wherein said first belt drives said steering transmission mechanism; and
a second belt which is driven by said prime mover through said first belt and whose driving speed varies by operation of said accelerator.

17. The axle driving apparatus as set forth in claim 16, further comprising:
a common input device drivingly connected to said prime mover, wherein a rotational force of said common input device is shared between said first belt and said steering transmission mechanism.

18. An axle driving apparatus for a vehicle having a prime mover and a belt driven stepless transmission, said belt driven transmission including:
a first belt which receives power of said prime mover;
a first idler pulley over which said first belt is looped for variation of a tension of said first belt;
an accelerator operatively connected to said first idler pulley;
a second belt;
a variator pulley over which said first and second belts are looped so as to allow a driving speed ratio of said second belt to said first belt to vary according to variation of the tension of said first belt by operation of said accelerator; and
a second idler pulley over which said second belt is looped for absorbing variation of tension of said second belt,
wherein said axle driving apparatus comprises:
a pair of axles connected to respective drive wheels;
a propelling transmission mechanism for rotating said axles together at various speeds in a common direction selected from two opposite directions for forward and backward traveling of said vehicle;

a propelling input pulley serving as an input pulley of said propelling transmission mechanism, wherein said second belt is looped over said propelling input pulley;

a steering transmission mechanism for differentially rotating said axles at various differences of rotational speed between said axles;

a steering operation device operatively connected to said steering transmission mechanism; and a steering input pulley serving as an input pulley of said steering transmission, wherein said first belt is looped over said steering input pulley.

19. The axle driving apparatus as set forth in claim 18, further comprising:

a common housing incorporating said pair of axles, said propelling transmission mechanism and said steering transmission mechanism together.

20. The axle driving apparatus as set forth in claim 18, further comprising:

a first housing incorporating said pair of axles and said propelling transmission mechanism; and a second housing incorporating said steering transmission mechanism.

21. The axle driving apparatus as set forth in claim 18, said propelling transmission mechanism further comprising:

a switching device, whose output rotational direction is selected from two opposite directions, wherein said propelling transmission mechanism transmits the selected one directive output rotation of said switching device to both said axles so as to rotate said axles together in one corresponding common direction.

22. The axle driving apparatus as set forth in claim 18, further comprising:

a first differential mechanism differentially connecting said pair of axles to each other, wherein said propelling transmission mechanism transmits power through said first differential mechanism to both said axles so as to rotate said axles together in said selected common direction; and a second differential mechanism for generating two oppositely directive rotations, wherein said steering transmission mechanism transmits power through said second differential mechanism to said respective axles so as to differentially rotate said axles.

23. The axle driving apparatus as set forth in claim 22, further comprising:

a common housing incorporating said pair of axles, said propelling transmission mechanism, said steering transmission mechanism, said first differential mechanism and said second differential mechanism together.

24. The axle driving apparatus as set forth in claim 22, further comprising:

a first housing chamber incorporating said pair of axles, said propelling transmission mechanism, said first differential mechanism and said second differential mechanism; and a second housing chamber incorporating said steering transmission mechanism.

25. The axle driving apparatus as set forth in claim 22, further comprising:

a first housing incorporating said pair of axles, said propelling transmission mechanism and said first differential mechanism;

a second housing incorporating said steering transmission mechanism and said second differential mechanism; and a transmission mechanism interposed between said first and second housings so as to transmit said two oppositely directive output rotations of said second differential mechanism to said axles.

26. The axle driving apparatus as set forth in claim 22, said propelling transmission mechanism further comprising:

a switching device, whose output rotational direction is selected from two opposite directions, wherein said propelling transmission mechanism transmits the selected one directive output rotation of said switching device to both said axles so as to rotate said axles together in one corresponding common direction.

27. The axle driving apparatus as set forth in claim 18, wherein said steering transmission mechanism comprises a hydrostatic transmission.

28. The axle driving apparatus as set forth in claim 18, wherein said first belt is driven at a constant speed determined according to the output rotational speed of said prime mover.

29. An axle driving apparatus for a vehicle having a prime mover and a belt driven stepless transmission, said belt driven transmission including:

a first belt;

a first idler pulley over which said first belt is looped for variation of a tension of said first belt;

an accelerator operatively connected to said first idler pulley, a second belt;

a variator pulley over which said first and second belts are looped so as to allow a driving speed ratio of said second belt to said first belt to vary according to variation of the tension of said first belt by operation of said accelerator; and second idler pulley over which said second belt is looped for absorbing variation of tension of said second belt, wherein said axle driving apparatus comprises:

a pair of axles connected to respective drive wheels;

a switching device for selecting forward or backward traveling of said vehicle;

a propelling transmission mechanism for rotating said axles together at various speeds in a common direction corresponding to the selected output rotational direction of said switching device for forward or backward traveling of said vehicle;

a propelling input pulley serving as an input pulley of said propelling transmission mechanism, wherein said second belt is looped over said propelling input pulley;

a steering transmission mechanism for differentially rotating said axles at various differences of rotational speed between said axles;

a steering operation device operatively connected to said steering transmission mechanism; and a common input mechanism for receiving power of said prime mover, wherein the output of said common input device is shared between said steering transmission mechanism and said first belt of said belt driven stepless transmission.

30. The axle driving apparatus as set forth in claim 29, further comprising:

a common housing incorporating said pair of axles, said propelling transmission mechanism, said steering transmission mechanism and said common input mechanism together.

31. The axle driving apparatus as set forth in claim 29, further comprising:

a first housing incorporating said pair of axles and said propelling transmission mechanism; and a second housing incorporating said steering transmission mechanism and said common input mechanism.

32. The axle driving apparatus as set forth in claim 29, wherein said common input mechanism comprises a switching device whose output rotational direction is selected from two opposite directions and transmitted to said steering transmission mechanism and said first belt of said belt driven stepless transmission.

33. The axle driving apparatus as set forth in claim 29, further comprising:

a first differential mechanism differentially connecting said pair of axles to each other, wherein said propelling transmission mechanism transmits power through said first differential mechanism to both said axles so as to rotate said axles together in said selected common direction; and a second differential mechanism for generating two oppositely directive rotations, wherein said steering transmission mechanism transmits power through said second differential mechanism to said respective axles so as to differentially rotate said axles.

34. The axle driving apparatus as set forth in claim 33, further comprising:

a common housing incorporating said pair of axles, said propelling transmission mechanism, said steering transmission mechanism, said first differential mechanism, said second differential mechanism, and said common input mechanism together.

35. The axle driving apparatus as act forth in claim 33, further comprising:

a first housing chamber incorporating said pair of axles, said propelling transmission mechanism, said first differential mechanism and said second differential mechanism; and a second housing chamber incorporating said steering transmission mechanism and said common input mechanism.

36. The axle driving apparatus as set forth in claim 33, further comprising:

a first housing incorporating said pair of axles, said propelling transmission mechanism and said first differential mechanism;

a second housing incorporating said common input mechanism, said steering transmission mechanism and said second differential mechanism; and a transmission mechanism interposed between said first and second housings so as to transmit said two oppositely directive output rotations of said second differential mechanism to said axles.

37. The axle driving apparatus as set forth in claim 33, wherein said common input mechanism comprises a switching device whose output rotational direction is selected from two opposite directions and transmitted to said steering transmission mechanism and said first belt of said belt driven stepless transmission.

38. The axle driving apparatus as set forth in claim 29, wherein said steering transmission mechanism comprises a hydrostatic transmission.

39. The axle driving apparatus as set forth in claim 38, further comprising:

a pump shaft of said hydrostatic transmission, said pump shaft being driven by said common input mechanism, and a power taking-out pulley fixed on said pump shaft, wherein said first belt is looped over said power taking-out pulley so as to transmit the rotational force of said pump shaft to said first belt.

40. The axle driving apparatus as set forth in claim 29, wherein said first belt is driven at a constant speed determined according to the output rotational speed of said prime mover.

41. An axle driving apparatus for a vehicle having a prime mover and a belt driven stepless transmission, said belt driven transmission including:

a first belt which receives power of said prime mover;

a first idler pulley over which said first belt is looped for variation of a tension of said first belt, an accelerator operatively connected to said first idler pulley;

a second belt;

a variator pulley over which said first and second belts are looped so as to allow a driving speed ratio of said second belt to said first belt to vary according to variation of the tension of said first belt by operation of said accelerator; and a second idler pulley over which said second belt is looped for absorbing variation of tension of said second belt, wherein said axle driving apparatus comprises:

a pair of axles connected to respective drive wheels;

a steering transmission mechanism for differentially rotating said axles at various differences of rotational speed between said axles;

a steering operation device operatively connected to said steering transmission mechanism;

a first input pulley over which said first belt is looped, said first input pulley serving as an input pulley of said steering transmission;

a second input pulley over which said second belt is looped; and a propelling transmission mechanism which differentially connects said first and second input pulleys to each other and transmits a resultant rotation of said first and second input pulleys to both said axles so as to rotate said axles together at various speeds in a common direction corresponding to the direction of said resultant rotation for forward or backward traveling of said vehicle.

42. The axle driving apparatus as set forth in claim 41, further comprising:

a common housing incorporating said propelling transmission mechanism and said steering transmission mechanism together.

43. The axle driving apparatus as set forth in claim 41, further comprising:

a differential mechanism differentially connecting said pair of axles to each other, wherein said propelling transmission mechanism transmits said resultant rotation of said first and second input pulleys through said differential mechanism to both said axles so as to rotate said axles together at various speed in said common direction.

44. The axle driving apparatus as set forth in claim 43, further comprising:

a common housing incorporating said pair of axles, said propelling transmission mechanism, said steering transmission mechanism and said differential mechanism together.

45. The axle driving apparatus as set forth in claim 41, wherein an output force of said steering transmission mechanism is applied onto one of said axles.

46. The axle driving apparatus as set forth in claim 45, further comprising:

a clutch interposed between an output portion of said steering transmission mechanism and said one of said axles.

47. The axle driving apparatus as set forth in claim 41, wherein said propelling transmission mechanism comprises a planetary gear unit.

48. The axle driving apparatus as set forth in claim 47, said propelling transmission mechanism comprising;

a sun gear fixed to said first drive pulley;

a variable-speed gear fixed to said second drive pulley;

a ring gear including an outer gear and an inner gear, wherein said outer gear of said ring gear engages with said variable-speed gear; and a planet gear engaging between said sun gear and said inner gear of said ring gear, wherein the revolution of said planet gear around said sun gear is transmitted to said pair of axles so as to rotate said axles together at various speeds in a common direction corresponding to either forward or backward traveling of said vehicle.

49. The axle driving apparatus as set forth in claim 41, wherein said propelling transmission mechanism comprises a bevel gear differential unit.

50. The axle driving apparatus as set forth in claim 41, wherein said steering transmission mechanism comprises a hydrostatic transmission.

51. The axle driving apparatus as set forth in claim 50, said pair of axles are differentially connected to each other, further comprising:

a clutch interposed between an output portion of said hydrostatic transmission and one of said axles.

52. The axle driving apparatus as set forth in claim 50, said hydrostatic transmission further comprising:

a hydraulic pump;

a hydraulic motor;

a pair of passages interposed between said hydraulic pump and said hydraulic motor so as to constitute a closed fluid circuit of said hydrostatic transmission; and a bypass interposed between said pair of oil passages.

53. The axle driving apparatus as set forth in claim 50, said hydrostatic transmission further comprising:

a hydraulic pump provided on an axial direction thereof with a pump shaft; and a hydraulic motor provided on an axial direction thereof with a motor shaft, wherein said pump shaft and said motor shaft are perpendicular to each other.

54. The axle driving apparatus as set forth in claim 53, said hydrostatic transmission further comprising:

a center section formed therein with a closed fluid circuit for fluidly connecting said hydraulic pump and said hydraulic motor mounted thereonto with each other, wherein said pump shaft and said motor shaft are perpendicular to each other.

55. The axle driving apparatus as set forth in claim 53, said hydrostatic transmission further comprising:

a center section formed therein with a closed fluid circuit for fluidly connecting said hydraulic pump and said hydraulic motor mounted thereonto with each other, wherein said center section is L-like shaped so as to arrange said pump shaft and said motor shaft in perpendicular to each other.

56. The axle driving apparatus as set forth in claim 41, wherein said first belt is driven at a constant speed determined according to the output rotational speed of said prime mover.

* * * * *

UNITED STATES PATENT AND TRADEMARK OFFICE
CERTIFICATE OF CORRECTION

PATENT NO.    : 6,830,115 B2
DATED         : December 14, 2004
INVENTOR(S)   : Okada et al.

It is certified that error appears in the above-identified patent and that said Letters Patent is hereby corrected as shown below:

Title page,
Item [56], References Cited, FOREIGN PATENT DOCUMENTS, please insert the following:
-- JP 62-28554
  JP 1-234644 --

Column 17,
Line 57, please replace "appositely" with -- oppositely --.

Column 18,
Line 19, replace "vanes" with -- varies --.
Line 31, please replace "asset" with -- as set --.

Signed and Sealed this

Fifth Day of April, 2005

JON W. DUDAS
*Director of the United States Patent and Trademark Office*